(12) United States Patent
He et al.

(10) Patent No.: US 11,710,065 B2
(45) Date of Patent: Jul. 25, 2023

(54) UTILIZING A BAYESIAN APPROACH AND MULTI-ARMED BANDIT ALGORITHMS TO IMPROVE DISTRIBUTION TIMING OF ELECTRONIC COMMUNICATIONS

(71) Applicant: Adobe Inc., San Jose, CA (US)

(72) Inventors: Jun He, Fremont, CA (US); Shiyuan Gu, Santa Clara, CA (US); Zhenyu Yan, Cupertino, CA (US); Wuyang Dai, San Jose, CA (US); Yi-Hong Kuo, Sunnyvale, CA (US); Abhishek Pani, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 1150 days.

(21) Appl. No.: 16/371,460

(22) Filed: Apr. 1, 2019

(65) Prior Publication Data
US 2020/0311487 A1    Oct. 1, 2020

(51) Int. Cl.
*G06F 40/279* (2020.01)
*G06N 20/00* (2019.01)
(Continued)

(52) U.S. Cl.
CPC ........... *G06N 20/00* (2019.01); *G06F 18/214* (2023.01); *G06F 18/24155* (2023.01); *G06F 40/279* (2020.01); *G06N 7/01* (2023.01)

(58) Field of Classification Search
CPC .. G06K 9/6278; G06K 9/6256; G06F 40/279; G06N 7/005; G06N 20/00
(Continued)

(56) References Cited

U.S. PATENT DOCUMENTS

| 2005/0165520 A1* | 7/2005 | Ariyur ............... G05B 23/0232 701/3 |
| 2011/0271175 A1* | 11/2011 | Lavi ................... G06F 16/9577 715/234 |

(Continued)

OTHER PUBLICATIONS

Chapelle et al. (Simple and Scalable Response Prediction for Display Advertising, published 2014, pp. 1-34) (Year: 2014).*

(Continued)

*Primary Examiner* — Stephen S Hong
*Assistant Examiner* — Ahamed I Nazar
(74) *Attorney, Agent, or Firm* — Keller Preece PLLC

(57) ABSTRACT

The present disclosure relates to systems, methods, and non-transitory computer readable media for determining send times to provide electronic communications based on predicted response rates by utilizing a Bayesian approach and multi-armed bandit algorithms. For example, the disclosed systems can generate predicted response rates by training and utilizing one or more response rate prediction models to generate a weighted combination of user-specific response information and population-specific response information. The disclosed systems can further utilize a Bayes upper-confidence-bound send time model to determine send times that are more likely to elicit user responses based on the predicted response rates and further based on exploration and exploitation considerations. In addition, the disclosed systems can update the response rate prediction models and/or the Bayes upper-confidence-bound send time model based on providing additional electronic communications and receiving additional responses to modify model weights.

20 Claims, 12 Drawing Sheets

(51) Int. Cl.
*G06F 18/2415* (2023.01)
*G06F 18/214* (2023.01)
*G06N 7/01* (2023.01)

(58) Field of Classification Search
USPC .......................................... 382/224, 190, 229
See application file for complete search history.

(56) References Cited

U.S. PATENT DOCUMENTS

| | | | |
|---|---|---|---|
| 2012/0089455 A1* | 4/2012 | Belani | G06Q 30/0245 705/14.44 |
| 2016/0071120 A1* | 3/2016 | Fleischman | H04N 21/252 705/7.29 |
| 2018/0176331 A1* | 6/2018 | Jain | H04L 67/63 |
| 2019/0068753 A1* | 2/2019 | Jain | H04L 67/63 |
| 2020/0074294 A1* | 3/2020 | Long | G06F 40/247 |

OTHER PUBLICATIONS

Collier et al. (Deep Contextual Multi-armed Bandits, published Jul. 2018, pp. 1-6) (Year: 2018).*
Andrew Gelman, John B. Carlin, Hal S. Stern, David B. Dunson, Aki Vehtari, Donald B. Rubin. 2013. Bayesian Data Analysis. New York: Chapman and Hall/CRC.
E Kaufmann, O Cappé, A Garivier. 2012. "On Bayesian upper confidence bounds for bandit problems." Artificial Intelligence and Statistics.

* cited by examiner

| User ID | Send Time | User Attribute 0 (Age Group) | User Attribute i | User Attribute n | Time Granularity 0 (Hour in a Week) | Time Granularity j | Time Granularity m | Label |
|---|---|---|---|---|---|---|---|---|
| ui_235449857 | 2018-05-16 9:35:15 | 35-40 | ... | ... | 57 | ... | ... | 1 |
| ui_235449857 | 2018-05-17 11:24:34 | 35-40 | ... | ... | 83 | ... | ... | 0 |
| ui_235432875 | 2018-05-17 15:56:45 | 21-25 | ... | ... | 89 | ... | ... | 0 |

UTILIZING A BAYESIAN APPROACH AND MULTI-ARMED BANDIT ALGORITHMS TO IMPROVE DISTRIBUTION TIMING OF ELECTRONIC COMMUNICATIONS

BACKGROUND

Advancements in software and hardware platforms have led to a variety of improvements in systems that provide targeted digital communication to client devices. For example, digital communication distribution systems are now able to provide digital communications to many different client devices across computer networks based on previous digital interactions with digital content. Indeed, some systems can select distribution times to provide digital communications to client devices based on pre-determined heuristics, historical AB testing, and/or global population data that reflect history of digital interactions.

Despite these advances however, conventional digital communication distribution systems continue to suffer from a number of disadvantages, particularly in their accuracy, efficiency, and flexibility. Indeed, conventional systems often inaccurately determine distribution times for providing digital communications to users to effectively elicit client device responses. As mentioned, many of these conventional systems utilize heuristic approaches that are not data-driven. As a result of relying on inferences and pre-determined rules, these systems fail to accurately determine effective distribution timing for providing digital communications. Although some systems collect and analyze data (such as AB testing) these systems base timing determinations on broad-spectrum information that is population-based and not individualized to particular client devices and users. Similarly, conventional digital communication distribution systems that utilize historical timing information for a global population fail to accurately account for individualized circumstances of client devices and corresponding users. For example, these systems calculate response rate of an entire population by send time and select a distribution with the highest response rate. These systems are often too general and therefore exhibit significantly lower performance in distribution of digital communications.

Additionally, many conventional digital communication distribution systems are inefficient. In particular, conventional digital communication distribution systems are computationally expensive to implement. For example, many conventional digital communication distribution systems rely on Monte Carlo simulations to determine timing for providing digital communications to client devices. Such systems require extensive computation power and computation time. In addition, due at least in part to the inaccuracy of conventional systems, these systems further inefficiently utilize computer resources in generating and providing digital communications to users at ineffective (or less effective) times. Thus, these conventional digital communication distribution systems waste computation time and power in providing digital communications that yield relatively few results.

Moreover, many conventional digital communication distribution systems are also inflexible. For example, many digital communication distribution systems are limited to rigid, population-based timing determinations and cannot therefore adapt to individualized client information. In addition, many of these conventional systems cannot adapt to situations where data is incomplete or sparse. For example, if a conventional system has sparse data for responses of a population, such systems rigidly apply global population-based information to generate timing determinations, which can further result in inaccuracies and inefficiencies.

Thus, there are several disadvantages with regard to conventional digital communication distribution systems.

SUMMARY

One or more embodiments described herein provide benefits and solve one or more of the foregoing or other problems in the art with systems, methods, and non-transitory computer readable media that determine send times for providing electronic messages to client devices utilizing Bayesian approaches and multi-armed bandit algorithms. Indeed, in one or more embodiments the disclosed systems generate response rate predictions for users by training and implementing one or more response rate prediction models in conjunction with an optimization send time model. In a Bayesian way, the disclosed systems can dynamically balance data collected from different perspectives (e.g., from different user attribute groups and/or from different time granularities) depending on the quantity of data collected for each perspective. In addition, the disclosed systems can utilize a Bayes upper-confidence-bound send time model to determine a distribution time to improve a target metric. Additionally, by utilizing a Bayes upper-confidence-bound send time model the disclosed systems can efficiently balance between exploration and exploitation in situations where data is sparse. Furthermore, the disclosed systems can apply a constraint regression approach to bridge the discrepancy of individual behavior with a population before Bayesian smoothing, which allows for accurately applying information from a population, even when individual scale is quite different from the population scale. In this manner, the disclosed systems can efficiently, accurately, and flexibly determine send times for providing electronic communications to client devices across computer networks.

Additional features and advantages of the present application will be set forth in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 6 illustrates an example table of extended training data for training a response rate prediction model in accordance with one or more embodiments;

DETAILED DESCRIPTION

Figure 1:
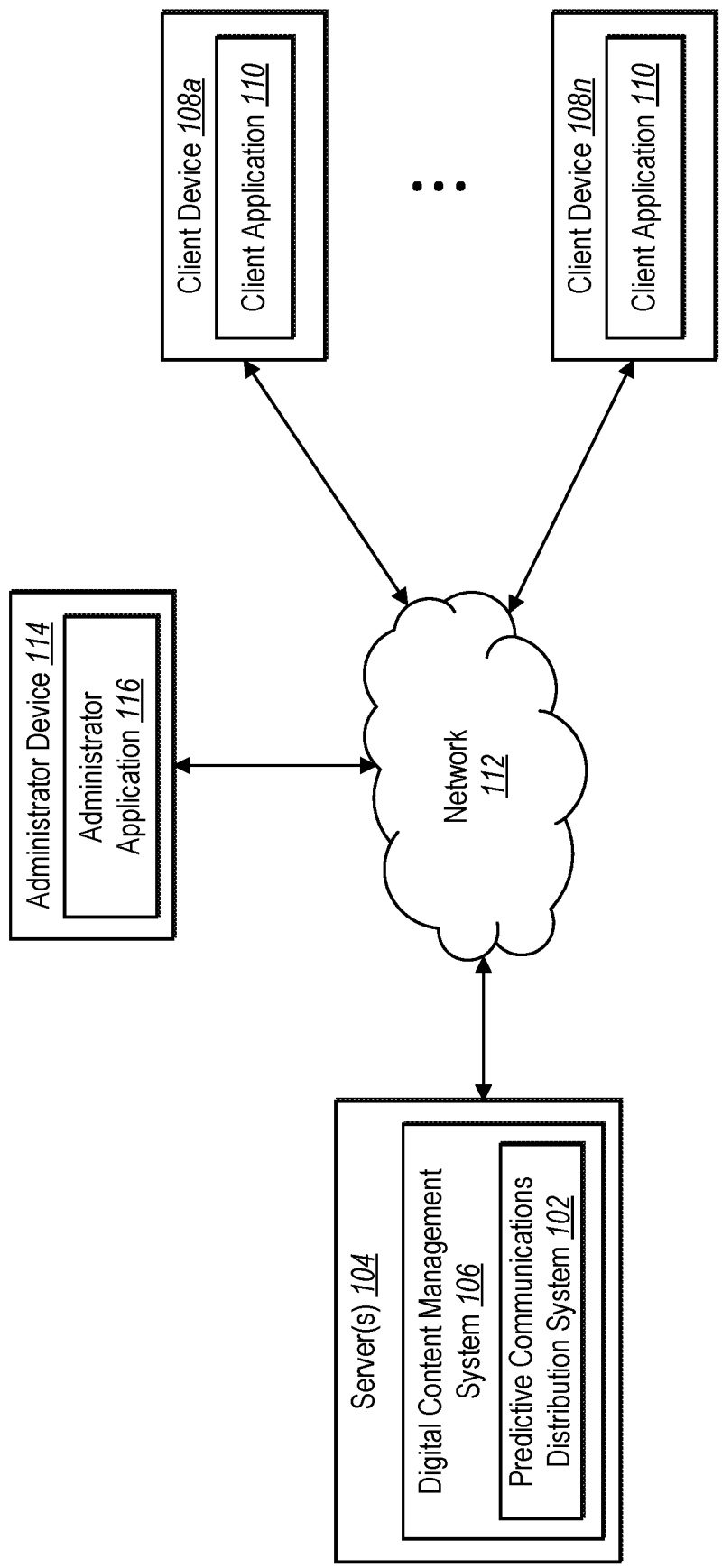
FIG. 1 illustrates an example environment for implementing a predictive communications distribution system in accordance with one or more embodiments.

One or more embodiments described herein provide benefits and solve one or more of the foregoing or other problems in the art with a predictive communications distribution system for providing electronic communications to client devices utilizing Bayesian approaches in conjunction with multi-armed bandit algorithms. In particular, the predictive communications distribution system can utilize one or more response rate prediction models in conjunction with a Bayes upper-confidence-bound send time model that leverages machine learning methods to generate distribution times for electronic communications. In training and applying a response rate prediction model, the predictive communications distribution system can dynamically balance information collected for an individual user or client device at a particular time granularity with information collected for broader populations (e.g., user attribute groups) across coarser time granularities. By intelligently borrowing information from other populations and time granularities with Bayesian approaches, in one or more embodiments the predictive communications distribution system accurately balances trade-off between bias and variance, reducing noise in model prediction without over-generalizing to the global population. In addition, by utilizing a Bayes upper-confidence-bound send time model the predictive communications distribution system can be self-exploratory, automatically balancing the need for additional data in sparse regions while improving performance in distribution of electronic communications.

As just mentioned, to generate a predicted response rate, the predictive communications distribution system can utilize one or more trained response rate prediction models. In particular, in one or more embodiments the predictive communications distribution system utilizes a response rate prediction model that utilizes different weighted combinations of attribute groups and time granularities to accurately determine a response rate for a particular client device at a target time granularity. For example, to determine a response rate for a given user at a given hour of the day, the response rate prediction model can analyze historical data corresponding to that user at different hours. In addition, the response rate prediction model can analyze broader attribute groups at coarser time granularities. Specifically, in some embodiments the predictive communications distribution system intelligently weights historical responses of different attribute groups at different coarse time granularities relative to the individual user's historical interactions. This approach reduces inaccuracy and variance resulting from relying on the individual user's historical interactions while also avoiding bias resulting from relying on general population information.

The response rate prediction model can utilize a variety of metrics in determining response rates at a target time granularity. For example, to generate a predicted response rate for a user at a particular hour, in one or more embodiments the predictive communications distribution system determines a label rate for the user at that hour (e.g., a number of responses relative to a number of electronic messages sent during the hour). The predictive communications distribution system can also determine label rates for broader attribute groups at coarser time granularities (e.g., a number of responses in a day for all users in the same location relative to the number of electronic messages sent during the day in the location). The predictive communications distribution system can determine a plurality of different label rates, each label rate corresponding to a different combination of a time granularity and an attribute group.

As mentioned, in one or more embodiments the predictive communications distribution system intelligently weights the determined label rates by utilizing a response rate prediction model. Specifically, the response rate prediction model can learn and apply different weights for different label rates corresponding to different attribute groups and time granularities (e.g., a user weight for a user label weight, a first group weight for a first group label rate, etc.). In one or more embodiments, the response rate prediction model applies different weights for different client devices/users and across different iterations. Indeed, as the response rate prediction model gathers additional data regarding individual client devices and users, the response rate prediction model can utilize a Bayesian approach to place additional weight on label rates corresponding to an individual user and less weight on label rates corresponding to broader populations (e.g., broader attribute groups at coarser time granularities).

In one or more embodiments, the response rate prediction model intelligently learns weights to apply in determining a response rate. In particular, the predictive communications distribution system can train a response rate prediction model to learn different weights that apply to label rates for different combinations of user attribute groups and time granularities in determining a predicted response rate. To elaborate, in some embodiments the predictive communications distribution system trains a response rate prediction model based on an objective function or a series of objective functions. For example, the predictive communications distribution system can apply an objective function to reduce discrepancy between a predicted response rate and a ground truth (e.g., label).

As further mentioned above, the predictive communications distribution system can utilize a response rate prediction model in conjunction with a send time model to determine distribution times for electronic communications. Specifically, in one or more embodiments the predictive communications distribution system utilizes a response rate prediction model to determine estimated response rates and then utilize a send time model to select a send time based on the predicted response rates. For example, the predictive communications distribution system can generate a ranking of possible send times from within a target time granularity.

As mentioned above, in one or more embodiments the predictive communications distribution system implements a Bayes upper-confidence-bound send time model to determine a send time that balances both exploration (e.g., data gathering in sparse regions to improve future performance) and exploitation (improving immediate performance based on current information). As described in greater detail below, the predictive communications distribution system can utilize a Bayes upper-confidence-bound send time model to analyze available data and predicted response rates from the response rate prediction model. The Bayes upper-confidence-bound (UCB) send time model treat response rate by send time as multi-armed bandit problem and use the UCB approach to select a send time that improves performance (e.g., exploitation) while sending digital messages where observations are sparse and estimation of response rates are uncertain (e.g., exploitation). The predictive communications distribution system can user other solutions to bandit problems, such as Thompson Sampling and etc., which can also solve the balance of exploration and exploitation for response rate by send time prediction.

As mentioned, in one or more embodiments the predictive communications distribution system utilizes a Bayesian approach to iteratively select distribution times in response to gathering additional samples. For example, in response to receiving additional responses to electronic communications, the predictive communications distribution system can utilize a response rate prediction model to modify weights to generate a modified or updated response rate prediction model. The predictive communications distribution system can utilize the updated response rate prediction model to generate additional estimated response rates. Moreover, the predictive communications distribution system can apply the Bayes upper-confidence-bound send time model based on the estimated response rates to determine send times for providing electronic communications.

As mentioned above, in one or more embodiments, the predictive communications distribution system also utilizes a scaling technique between individual data and population data. For example, the send time determination can apply constraint regression to account for discrepancy between individual client device/user behavior and population behavior. Specifically, in some embodiments the predictive communications distribution system applies a constraint regression in conjunction with Bayesian smoothing, which allows for more accurate application of label rates from different attribute groups at different time granularities.

The predictive communications distribution system provides several advantages over conventional digital communication distribution systems. For example, the predictive communications distribution system improves accuracy over conventional digital communication distribution systems. More specifically, the predictive communications distribution system utilizes individualized client-specific information, intelligently weighted with different combinations of different user attribute graphs at different time granularities, to more accurately determine send times for providing electronic communications to client devices. Indeed, by dynamically utilizing granular information (e.g., personal user information and finer time granularities) intelligently supplemented with coarse information from broader populations where needed, the predictive communications distribution system more accurately determines send times relative to individual client devices/users.

In addition, the predictive communications distribution system improves efficiency over conventional systems. Particularly, the predictive communications distribution system more efficiently utilizes computer resources such as processing time and processing power. Whereas conventional systems rely on computationally expensive probability models (e.g., Monte Carlo simulations) to determine send times for providing electronic communications, the predictive communications distribution system utilizes a more efficient Bayesian analysis. Additionally, due at least in part to the improved accuracy of the predictive communications distribution system, the predictive communications distribution system further improves efficiency over conventional systems by more efficiently providing electronic communications at more effective times for eliciting user responses. Thus, compared to these conventional systems, the predictive communications distribution system wastes fewer computer resources in generating and distributing electronic communications that do not produce responses.

As a further advantage, the predictive communications distribution system improves flexibility over conventional digital communication distribution systems. Particularly, the predictive communications distribution system is adaptive on an individual-by-individual basis. Indeed, the predictive communications distribution system uniquely tailors distribution time for electronic communications to individual users/client devices. The predictive communications distribution system is further flexible in its balance of trade-off bias and variance. For example, when samples for an individual user on a target time granularity are sparse, the predictive communications distribution system adaptively borrows information from a larger population (e.g., an attribute group to which the user belongs, representing a coarser attribute granularity) and a coarser time granularity. As the send determination system gathers additional samples for an individual at a particular time granularity, the predictive communications distribution system can dynamically reduce emphasis on information from broader populations.

Indeed, the predictive communications distribution system further utilizes a self-exploratory technique to more flexibly adapt to changing data. To illustrate, the predictive communications distribution system adjusts send time predictions for individual users based on receiving new data relative to the user and/or new data for the population. Indeed, as opposed to many conventional systems, the predictive communications distribution system utilizes multi-armed bandit algorithms to explore those times where predictions are uncertain and/or where data is sparse to balance between exploration and exploitation.

Furthermore, the predictive communications distribution system is adaptive to existing data frameworks. For example, whereas some conventional systems require a ground-up approach to integrate with data frameworks, the predictive communications distribution system is easy to implement on already-existing frameworks. The predictive communications distribution system is also flexible across multiple scales. Indeed, as discussed above, the predictive communications distribution system can implement a constraint regression prior to Bayesian smoothing to more accurately utilize label rates from larger populations in generating a predicted response rate and send time for a particular client.

As illustrated by the foregoing discussion, the present disclosure utilizes a variety of terms to describe features and benefits of the predictive communications distribution system. Additional detail is hereafter provided regarding the meaning of these terms as used in this disclosure. In particular, the term "electronic communication" (or simply "communication") refers to electronic data provided to a user or a group of users. An electronic communication can include an electronic message of a variety of formats using a number of protocols such as email messages, text (e.g., SMS, MMS, RCS, or iMessage) messages, phone calls, mobile short messages, mobile application push notifications, web browser push notifications, or targeted digital content campaign banners. In addition, an electronic communication can include digital content in the form of digital audio, digital video, digital images, and/or digital text. Further, an electronic communication can include information pertaining to a product or service related to a digital content campaign. Indeed, an electronic communication can be distributed to users as part of a digital content campaign.

Relatedly, the term "response" refers to a result associated with, or instigated by, an electronic communication. Indeed, a response can include electronic data received based on a provided electronic communication. In particular, a response can include electronic data indicating a particular user action associated with an electronic communication such as an opening of the electronic communication, a click-through of the electronic communication, or a conversion associated with the electronic communication. Thus, based on providing electronic communications to users, the predictive communications distribution system can receive responses from users in the form of one or more user inputs or actions in relation to the electronic communications.

As mentioned, the predictive communications distribution system can receive an input from an administrator to set target metrics such as a target response and a target time granularity. As used herein, the term "target" (used as an adjective or descriptor) refers to an indicated metric desired by a user (e.g., an administrator or manager of a digital content campaign) or system. For example, the predictive communications distribution system can receive input from an administrator device to indicate target metrics such as target users and target response rates including one or more of an open rate, a click-through rate, or a conversion rate. In addition to target responses and target users, the predictive communications distribution system can also receive administrator input to set a target time granularity.

As used herein, the term "time granularity" refers to a measure or scale of time. Indeed, a time granularity can include a time scale that is comprised of increments or values of time that each have a uniform duration within the overall time horizon. Thus, a time granularity can include a resolution or scale of time that represents individual time values at a particular level of detail depending on the duration of the overall time horizon. Time granularities can vary from coarse time granularities to fine time granularities. For example, a time granularity can include an hour-in-a-day time granularity that includes 24 individual time values that each represent an hour of the day. Alternatively, a time granularity can include a day-in-a-week time granularity that includes 7 time values for each day of the week. Similarly, an hour-in-a-week time granularity can include 168 time values for each hour of the week. Thus, a "time value" refers to an increment of time within a time granularity. For example, a time value can include a specific hour, day, week, month (within a year time granularity), or other time increment within a particular time granularity.

Based on a target response and a target time granularity, the predictive communications distribution system can utilize a response rate prediction model to generate a predicted response rate associated with a user for the target response over the target time granularity. As used herein, the term "response rate prediction model" refers to a machine learning model for generating predictions of response rates based on input data. In particular, a response rate prediction model can include an algorithm comprised of a number weights for generating predictions based on input data. Indeed, the predictive communications distribution system can train the response rate prediction model to determine weights that generate accurate predicted response rates. Relatedly, the term "response rate" refers to a quantity or number of responses received (e.g., a number of responses over a given period of time divided by the number of communications delivered). For example, a response rate can include a number of responses received from a user or attribute group for a given time value within a time granularity divided by the number of communications delivered to that user or attribute group. Thus, a predicted response rate refers to a prediction of a response rate generated by a response rate prediction model based on input data such as a target time granularity and user attributes associated with a target user.

As used herein, the term "attribute group" (or "user attribute group") refers to a group of one or more users that share at least one common attribute. In addition, a "user attribute" refers to an attribute or characteristic associated with a user. For example, a user attribute can include a country associated with a user, an age group associated with the user, a user identification, a gender of the user, a sex of the user, a user interest, an income level associated with the user, or a geolocation of the user.

In addition, the term "train" refers to utilizing information to tune or teach a model (e.g., a machine learning model) such as a response rate prediction model. The term "training" (used as an adjective or descriptor, such as "training data," "training response," or "training electronic communication") refers to information or data utilized to tune or teach the model. In some embodiments, the predictive communications distribution system trains one or more response rate prediction models to generate accurate response rate predictions based on training data.

As mentioned, to generate a predicted response rate, the predictive communications distribution system utilizes a trained response rate prediction model to apply weights to label rates associated with users and/or attribute groups over various time granularities. As used herein, the term "label rate" refers to a historical (e.g., observed) quantity or number of responses used for training or validation (e.g., the quantity or number of responses divided by communications delivered to a user or user attribute group over a particular period of time). In particular, a label rate can reflect a measured relationship between a number of responses associated with a user or attribute group (for a time value of a particular time granularity) and a number of electronic communications provided to the user or attribute group (for the time value of the particular time granularity).

As also mentioned, the predictive communications distribution system utilizes a Bayes upper-confidence-bound send time model ("Bayes UCB model") to generate or determine a send time to provide an electronic communication to a user. As used herein, the term "Bayes UCB model" refers to a model or algorithm that balances exploration and exploitation in determining a send time. For example, the predictive communications distribution system implements a Bayes UCB model to generate quantile scores for various possible send times based on quantities of responses. Additional detail regarding a Bayes UCB model is provided below.

In addition, the term "send time" (or "distribution time") refers to a time to provide an electronic communication to a client device/user. For example, a send time can include a time value within a target time granularity. In one or more embodiments, the predictive communications distribution system provides electronic communications to client devices of users based on send times to maximize the probability of eliciting a response.

Additional detail regarding the predictive communications distribution system will now be provided with reference to the figures. For example, FIG. 1 illustrates a schematic diagram of an example environment for implementing a predictive communications distribution system 102 in accordance with one or more embodiments. An overview of the predictive communications distribution system 102 is described in relation to FIG. 1. Thereafter, a more detailed description of the components and processes of the predictive communications distribution system 102 is provided in relation to the subsequent figures.

As shown in FIG. 1, the environment includes server(s) 104, client devices 108a-108n, an administrator device 114, and a network 112. Each of the components of the environment can communicate via the network 112, and the network 112 may be any suitable network over which computing devices can communicate. Example networks are discussed in more detail below in relation to FIG. 11.

As mentioned, the environment includes client devices 108a-108n. The client devices 108a-108n can be one of a variety of computing devices, including a smartphone, a tablet, a smart a television, a desktop computer, a laptop computer, a virtual reality device, an augmented reality device, or some other computing device as described in relation to FIG. 11. FIG. 1 illustrates multiple different client devices 108a-108n, where each client device can be associated with one or more attribute groups. For example, the client device 108a can be associated with a user having one or more user attributes in common with users of client devices 108b and 108c. In addition, the user associated with the client device 108a can further share one or more user attributes with users associated with client devices 108e and 108d. Further, each of the client devices 108a-108n can receive user input in the form of responses to electronic communications and can provide information pertaining to user input to the server(s) 104. Thus, the predictive communications distribution system 102 on the server(s) 104 can receive responses to electronic communications provided to the client devices 108a-108n.

As shown, the client devices 108a-108n include a client application 110. In particular, the client application 110 may be a web application, a native application installed on the client devices 108a-108n (e.g., a mobile application, a desktop application, etc.), or a cloud-based application where all or part of the functionality is performed by the server(s) 104. The client application 110 can present or display information to a user, including an electronic communication within an email interface (or some other messaging or communication interface). Users can interact with the client application 110 to provide user input to, for example, open, click through, or purchase a product related to an electronic communication.

As further shown, the environment includes the administrator device 114. In particular, the administrator device 114 can communicate with the server(s) 104 and/or the client device 108a-108n via the network 112. For example, the administrator device 114 can receive input from an administrator via the administrator application 116 to set a target metric associated with a digital content campaign and/or for distributing electronic communications to the client devices 108a-108n. Indeed, the administrator application 116 may be a web application, a native application installed on the client devices 108a-108n (e.g., a mobile application, a desktop application, etc.), or a cloud-based application where all or part of the functionality is performed by the server(s) 104. In addition, the administrator application 116 may include functionality to set target metrics such as target users, target responses, and/or target time granularities for the digital content management system 106 and/or the predictive communications distribution system 102 to distribute electronic communications to the client devices 108a-108n. The administrator application 116 can also allow for selection of other digital content campaign parameters (e.g., duration, price, target audience, etc.) or provide digital content to include in electronic communications.

As illustrated in FIG. 1, the environment includes the server(s) 104. The server(s) 104 may generate, store, process, receive, and transmit electronic data, such as electronic communications and responses to electronic communications. For example, the server(s) 104 may receive data from the client device 108a in the form of a response. The server(s) 104 can transmit data to the client devices 108a-108n to provide electronic communications for display via the client application 110. In addition, the server(s) 104 can receive data from the administrator device 114 in the form of a selection of campaign parameters, digital content (to include in electronic communications), a target metric such as a target user, a target response, and/or a target time granularity. The server(s) 104 can communicate with the client devices 108a-108n and the administrator device 114 to transmit and/or receive data via the network 112. In some embodiments, the server(s) 104 comprises a content server. The server(s) 104 can also comprise an application server, a communication server, a web-hosting server, a social networking server, a digital content campaign server, or a digital communication management server.

As shown in FIG. 1, the server(s) 104 can also include the predictive communications distribution system 102 as part of a digital communication management system 106. The digital communication management system 106 can communicate with the client devices 108a-108n to generate, modify, and transmit digital communications, such as electronic communications. In some embodiments, though not illustrated in FIG. 1, the server(s) 104 further include one or more databases such as a training database, a response database, and/or an electronic communication database. In other embodiments, the databases are located externally from the server(s) 104 and is maintained by a third-party server connected via the network 112.

Although FIG. 1 depicts the predictive communications distribution system 102 located on the server(s) 104, in some embodiments, the predictive communications distribution system 102 may be implemented by (e.g., located entirely or in part) on one or more other components of the environment. For example, the predictive communications distribution system 102 may be implemented by the administrator device 114, the client devices 108a-108n, and/or a third-party device.

In some embodiments, though not illustrated in FIG. 1, the environment may have a different arrangement of components and/or may have a different number or set of components altogether. For example, the administrator device 114 and/or the client devices 108a-108n may communicate directly with the predictive communications distribution system 102, bypassing the network 112. Additionally, the predictive communications distribution system 102 can include one or more additional databases (e.g., a training database storing training data) housed on the server(s) 104 or elsewhere in the environment.

Figure 2A:
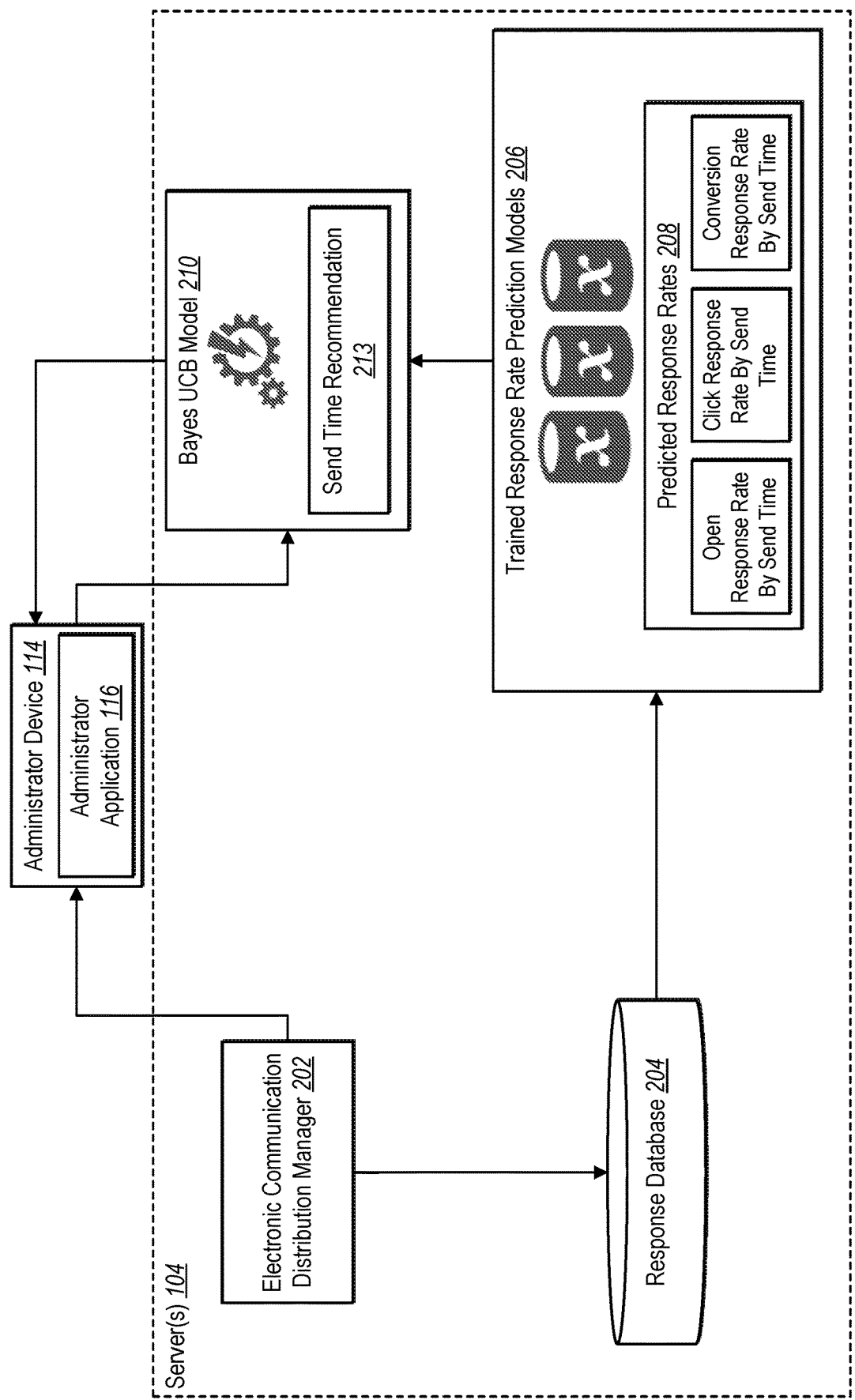
FIG. 2A illustrates example components of the predictive communications distribution system in accordance with one or more embodiments.
Figure 2B:
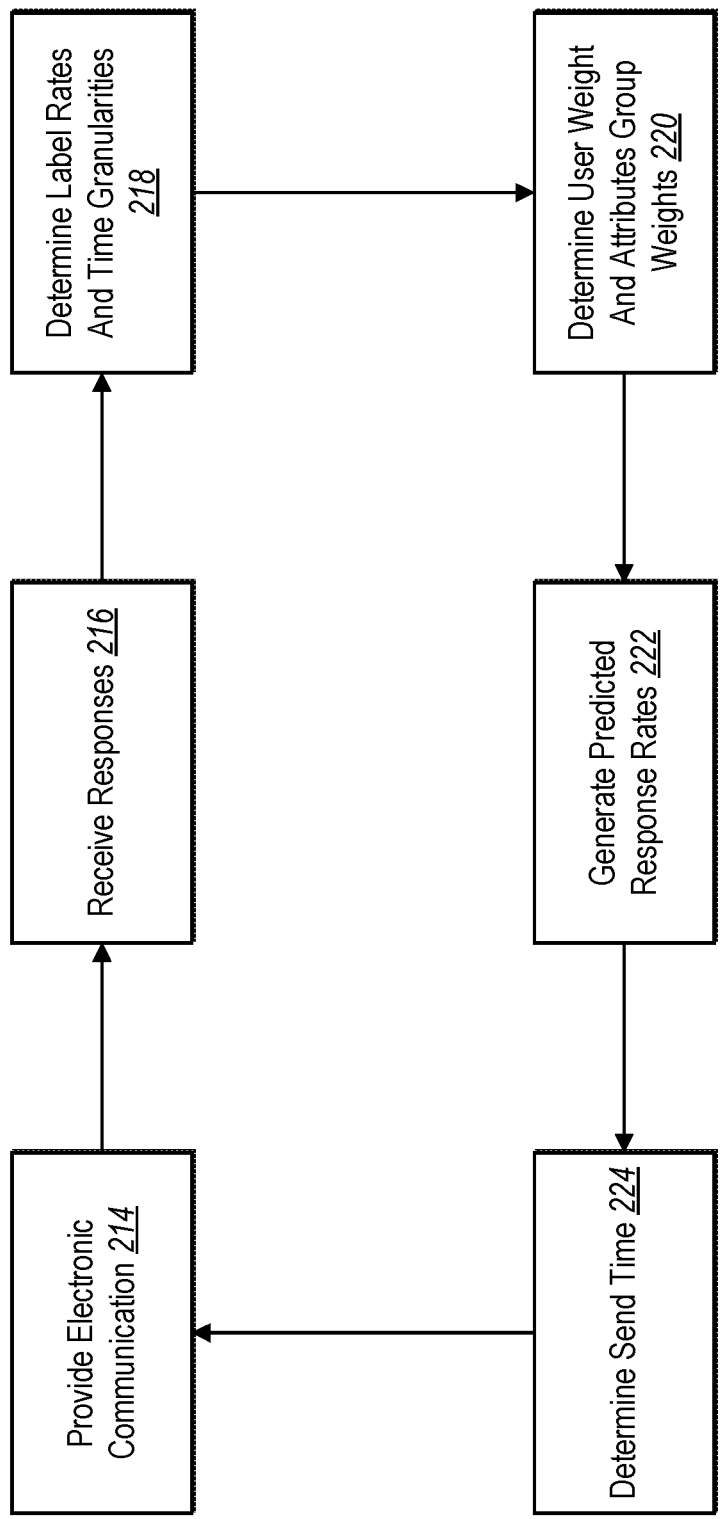
FIG. 2B illustrates an example series of acts for determining a send time for distributing electronic communications in accordance with one or more embodiments.

As mentioned, the predictive communications distribution system 102 can utilize one or more response rate prediction models and a Bayes UCB model to determine send times for providing electronic communications. FIG. 2A illustrates an example configuration of components of the predictive communications distribution system 102 in accordance with one or more embodiments. In addition, FIG. 2B illustrates various acts performed by the predictive communications distribution system 102 to determine a send time for providing an electronic communication to a user. Thereafter, additional detail is provided regarding the response rate prediction models and the Bayes UCB model in subsequent figures.

In some embodiments, the predictive communications distribution system 102 receives input from an administrator (e.g., via the administrator application 116 of the administrator device 114) to set target metrics for distributing electronic communications. For example, the predictive communications distribution system 102 receives a target time granularity to use as a basis for determining send times (e.g., by determining time values to provide electronic communications within the time granularity), a target response type (e.g., open, click, or conversion), and/or a target user. In some embodiments, however, the predictive communications distribution system 102 need not receive an indication of a target user. Instead, the predictive communications distribution system 102 determines send times for each user, respectively.

As illustrated in FIG. 2A, the predictive communications distribution system 102 includes a number of components housed on the server(s) 104 (or elsewhere in the environment of FIG. 1), including an electronic communication distribution manager 202, a response database 204, one or more trained response rate prediction models 206, and a Bayes UCB model 210. Although FIG. 2A illustrates each of these components as housed on the server(s) 104, in some embodiments one or more of the components may be associated externally to the server(s) 104 and may communicate with the server(s) 104 via the network 112. For example, in some embodiments the electronic communication distribution manager 202 is part of the administrator device 114. In these or other embodiments, the trained response rate prediction models 206 and/or the Bayes UCB model are hosted by a third-party server.

As shown, the predictive communications distribution system 102 (via the electronic communication distribution manager 202) distributes electronic communications to one or more users by providing emails, text messages, or other electronic communications to the client devices 108a-108n. The predictive communications distribution system 102 further receives responses to the electronic communications and store those responses within the response database 204.

Indeed, as illustrated in FIG. 2A, the predictive communications distribution system 102 communicates with a response database 204 (e.g., via the network 112). For example, the predictive communications distribution system 102 logs and stores responses (e.g., responses to distributed electronic communications) received from users (e.g., from the client devices 108a-108n) within the response database 204. Particularly, the predictive communications distribution system 102 logs the responses in conjunction with an identifier (e.g., device or user ID associated with client devices and/or users from whom the responses are respectively received). In some embodiments, the response database 204 is maintained by the predictive communications distribution system 102 at the server(s) 104, while in other embodiments the response database 204 is maintained by a third-party server.

Based on the received responses logged and stored with the response database 204, the predictive communications distribution system 102 generates predicted response rates for a given client device/user. Particularly, as illustrated in FIG. 2A, the predictive communications distribution system 102 utilizes trained response rate prediction models 206 to generate the predicted response rates 208.

Indeed, the predictive communications distribution system 102 generates the predicted response rates 208 over a target time granularity based on a weighted combination of label weights associated with users and attribute groups. To elaborate, the predictive communications distribution system 102 utilizes one or more trained response rate prediction models 206 to generate predicted response rates 208 by send time. For example, the predictive communications distribution system 102 utilizes response-type-specific response rate prediction models to generate predicted response rates depending on types of response rates indicated by an administrator (e.g., an open rate, a click-through rate, or a conversion rate).

The predictive communications distribution system 102 utilizes the response rate prediction models 206 to generate predicted response rates 208 by weighting the label rates associated with the user and the label rates associated with the various attribute groups to which the user belongs. To elaborate, the predictive communications distribution system 102 applies a user weight to the user label rate, applies a first group weight to a first group label rate (e.g., a first label weight of a first attribute group at a first time granularity), applies a second group weight to a second group label rate (e.g., a second label weight of a second attribute group at a second time granularity), and so on for all attribute groups associated with the user. Based on this weighted combination of label rates, the predictive communications distribution system 102 generates the predicted response rates 208 over a target time granularity. The predicted response rates 208 indicate a prediction of a number of responses (of each response rate type) that the user is likely to provide at each respective time value over the target time granularity.

Based on the predicted response rates, the predictive communications distribution system 102 further determines a send time to provide electronic communications to the user. To illustrate from FIG. 2A, the predictive communications distribution system 102 utilizes a Bayes UCB model 210 to generate a send time recommendation 213. Indeed, the predictive communications distribution system 102 receives (e.g., from the electronic communication distribution 202) an application programming interface ("API") call to utilize the Bayes UCB model 210 to determine a send time recommendation 213. For example, the predictive communications distribution system communicates with the administrator device 114 (e.g., as an input service endpoint) to receive an API call from the administrator device 114, where the API call can include (or be accompanied by) input parameters such as a user identification list, an objective function formula, and various weights for different types of response rates.

As illustrated in FIG. 2A, the predictive communications distribution system 102, based on the API call, triggers the Bayes UCB model 210 to generate the send time recommendation 213 based on the various input parameters mentioned above. For example, the predictive communications distribution system 102 receives the API call together with the input parameters and provides the input parameters to the Bayes UCB model 210. In addition, the predictive communications distribution system 102 provides the predicted response rates 208 to the Bayes UCB model 210 in conjunction with the input parameters associated with the API call. Thus, the Bayes UCB model 210 generates the send time recommendation 213 based on the predicted response rates 208 as well as the input parameters. For examples, the Bayes UCB model 210 generates a ranking of possible send times (e.g., time values) within a target time granularity. In some embodiments, the Bayes UCB model 210 provides a send time recommendation 213 as a highest-ranked time value within the time granularity.

The Bayes UCB model 210, treating response rate by send time prediction as a multi-armed bandit problem, based on amount of evidence collected for different send time, and predicted response rates (e.g., the predicted response rates 208), determine values of the final UCB modified predicted response rate by send time. Based on the target time granularity, the Bayes UCB model 210 generates a send time recommendation 213 that represents a send time with the highest value of response rate across the time values of the target time granularity (in consideration of exploration and exploitation). Indeed, the Bayes UCB model 210 does not, in every circumstance, provide the send time recommendation 213 for a time value with a highest response rate, but the Bayes UCB model 210 further determine the send time recommendation 213 to balance exploration (to improve the predictions of the response rate prediction models 206 and the Bayes UCB model 210 by providing additional electronic communications at time values when user responses are sparse with less evidence) and exploitation (to provide the best send time according to a current state of the response rate prediction models 206 and the Bayes UCB model 210). Effectively, a UCB approach will send more communications to time where the response rate prediction is high and reliable (based on more observations), or to time where response rate prediction is not as high but highly unreliable (based on very few observations).

In some embodiments, the predictive communications distribution system 102 generates a send time recommendation (e.g., the send time recommendation 213) utilizing a model other than the Bayes UCB model 210. For example, the predictive communications distribution system 102 utilizes a ranking model to rank time values across a target time granularity based on predicted response rates. To elaborate, with respect to a given user, the predictive communications distribution system 102 ranks each respective time value over a target time granularity based on the predicted response rates 208. In these or other embodiments, the predictive communications distribution system 102 utilizes a ranking model to select a time value with a highest predicted response rate as the send time recommendation 213.

Based on the send time recommendation 213, the predictive communications distribution system 102 further provides additional electronic communications to the user using the electronic communication distribution manager 202. In some cases, the predictive communications distribution system 102 further receives additional responses as a result of providing the additional electronic communications (e.g., to store in the response database 206). In response to providing the additional electronic communications and/or receiving the additional responses, the predictive communications distribution system 102 modifies the weights associated with the trained response rate prediction models 206. For example, the predictive communications distribution system 102 increases the user weight based on receiving additional responses from the user to more heavily consider the user label rate in the generation of predicted response rates. In some embodiments, the predictive communications distribution system 102 additionally (or alternatively) reduces one or more group weights associated with the group label rates as part of the weighted combination used to generate predicted response rates. Based on the modified weights, the predictive communications distribution system 102 generates new predicted response rates and further determines a new send time recommendation. Thus, the predictive communications distribution system 102 perpetually updates and modifies various weights or each respective user to stay up-to-date in generating accurate send times based on current numbers of responses associated with users and attribute groups.

As mentioned, the predictive communications distribution system 102 performs various acts in relation to the components described in FIG. 2A. Indeed, FIG. 2B illustrates a series of acts that the predictive communications distribution system 102 performs (e.g., utilizing one or more of the components illustrated in FIG. 2A) to determine a send time for providing electronic communications to effectively elicit responses. As illustrated in FIG. 2B, the predictive communications distribution system 102 performs an act 214 to provide electronic communications (e.g., via the electronic communications distribution manager 202). For example, the predictive communications distribution system 102 provides electronic communications based on send times that indicate when to distribute the electronic communications to various users.

In addition to the act 214 to provide electronic communications, the predictive communications distribution system 102 further performs an act 216 to receive responses (e.g., monitor and collect from the client devices 108a-108n). In particular, the predictive communications distribution system 102 receives responses to electronic communications that are distributed to client devices of particular users. For example, the predictive communications distribution system 102 receives responses in the form of opens, clicks, conversions, or other user actions performed in relation to, or as a result of, the electronic communications.

Based on receiving the responses in act 216, the predictive communications distribution system 102 further performs an act 218 to determine label rates and time granularities. As mentioned, the predictive communications distribution system 102 utilizes the label rates and time granularities to generate predicted response rates (e.g., the predicted response rates 208). For instance, the predictive communications distribution system 102 performs an act 220 to determine user weights and attribute group weights. Indeed, the predictive communications distribution system 102 determines a user weight to apply to a user label rate and a group weight to apply to a group label rate. The predictive communications distribution system 102 determines a user label rate for the user as the time for which the predictive communications distribution system 102 seeks to make a prediction. The predictive communications distribution system 102 also identifies different attribute groups corresponding to the user. The predictive communications distribution system 102 then determines attribute group label rates for the different of attribute groups at different coarse time granularities.

To elaborate, the predictive communications distribution system 102 generates attribute groups based on user attributes associated with users of the predictive communications distribution system 102. More specifically, the predictive communications distribution system 102 generates attribute groups that include users who share at least one user attribute, such as a common interest or a common age group. The predictive communications distribution system 102 further identifies one or more attribute groups associated with a given user (i.e., to which the user belongs), where the user shares a common user attribute with the attribute group. In this way, the predictive communications distribution system 102 identifies, for each user, one or more attribute groups that each share at least one user attribute with the user.

In addition to determining attribute groups, the predictive communications distribution system 102 further determines time granularities associated with the given user and the attribute groups. Specifically, the predictive communications distribution system 102 associates a target time granularity with the user and associates other time granularities with various attribute groups. As an example, to generate predicted response rates for the user on an hourly basis (e.g., a prediction of how many responses the user will provide at each hour within a day), the predictive communications distribution system 102 determines an hours-in-the-day time granularity for the user with 24 time values for the hours of the day. Additionally, the predictive communications distribution system 102 identifies other coarse time granularities, such as a days-in-the-week time granularity or a weeks-in-the-month time granularity. In some embodiments, the target time granularity is set as a finest time granularity, and the predictive communications distribution system 102 determines coarser time granularities. Upon identifying different time granularities, the predictive communications distribution system 102 generates various combinations of attribute groups and time granularities to use as a basis for generating predicted response rates for the user.

In addition, the predictive communications distribution system 102 also determines label rates (e.g., label rates for the user at the target time granularity or other time granularities as well as for the various attribute groups at the different time granularities). To illustrate, the predictive communications distribution system 102 determines label rates by determining, for the user and for each of the associated attribute groups, a send count representing a number of provided electronic communications and a response count indicating a number of received responses. In addition, the predictive communications distribution system 102 generates label rates by determining relationships between the send counts and the response counts. For example, the predictive communications distribution system 102 determines a label rate associated with the user by determining a relationship between the number of electronic communications provided to the user and the number of responses received from the user within a particular time. In a similar fashion, the predictive communications distribution system 102 determines a label rate for an attribute group by determining a relationship between the number of electronic communications provided to the users within the attribute group and the number responses received from the users within the attribute group within a particular time (of a time granularity).

The predictive communications distribution system 102 further performs an act 222 to generate predicted response rates (e.g., by utilizing the trained response rate prediction models 206). In particular, the predictive communications distribution system 102 generates the predicted response rates based on the user weights and group weights—e.g., based on a weighted combination of label rates associated with the user over a target time granularity and various attribute groups (that include the user) over other (e.g., coarser) time granularities. Indeed, the predictive communications distribution system 102 generates the predicted response rates to indicate user-based and group-based predictions for responses to electronic communications.

Based on the predicted response rates (e.g., the predicted response rates 208), the predictive communications distribution system 102 further performs an act 224 to determine a send time. For example, the predictive communications distribution system 102 generates a send time recommendation (e.g., the send time recommendation 213) to indicate when to distribute electronic communications to different users. In some embodiments, the predictive communications distribution system 102 further repeats the acts shown in FIG. 2 by, for example, repeating the acts 214 and 216 to provide additional electronic communications and receive additional responses to the additional electronic communications. Based on the additional responses, the predictive communications distribution system 102 modifies one or more weights such as user weights or group weights for generating predicted response rates and, in turn, determining the send time. Thus, by repeating the acts 214-224, the predictive communications distribution system 102 improves the accuracy of determining the send times and therefore more effectively elicits responses to provided electronic communications.

Figure 3:
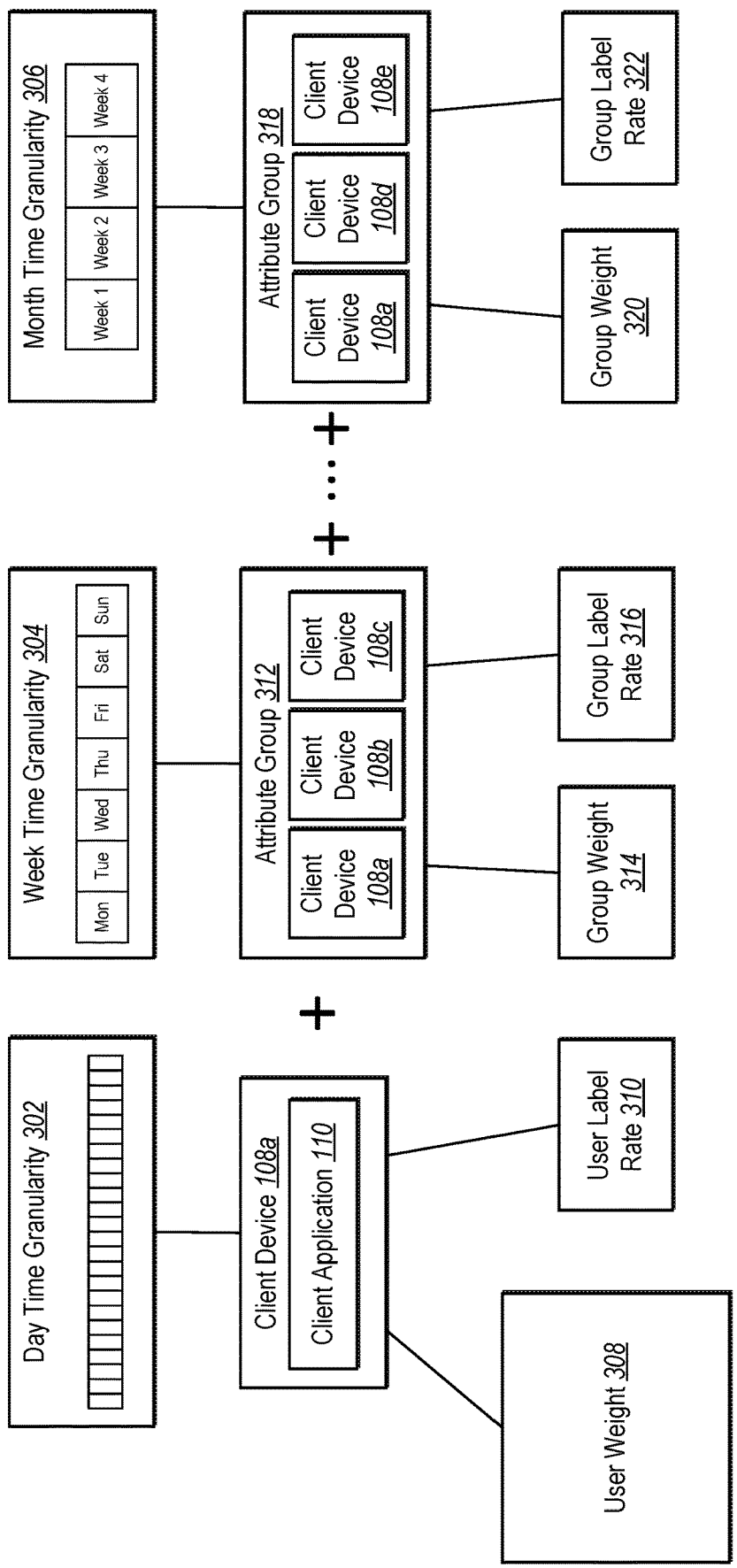
FIG. 3 illustrates a weighted combination associated with an example response rate prediction model in accordance with one or more embodiments.

As mentioned, the predictive communications distribution system 102 generates predicted response rates for a user over a target time granularity (e.g., a finest time granularity) by utilizing a response rate prediction model based on a weighted combination of label rates. Indeed, FIG. 3 illustrates an example weighted combination of label rates as generated by a response rate prediction model for generating a predicted response rate over a target day time granularity 302. As illustrated in FIG. 3, the predictive communications distribution system 102 generates predicted response rates for a user of the client device 108a over a day time granularity 302 (i.e., an hours-in-the-day time granularity) consisting of 24 hour time values. Thus, in the example, the predictive communications distribution system 102 generates predicted response rates for each hour within a day for the user of the client device 108a (and selects an hour within the 24 hour time values to send an electronic communication).

As shown, the predictive communications distribution system 102 generates a user label rate 310 associated with a user of the client device 108a. In addition, the predictive communications distribution system 102 generates a number of group label rates (e.g., group label rates 316 and 322) associated with attribute groups (e.g., attribute groups 312 and 318). Specifically, the group label rates 316 and 322 correspond to attribute groups 312 and 318 that include the user associated with the client device 108a. In addition, the predictive communications distribution system 102 also identifies different (coarser) time granularities (e.g., the week time granularity 304 and the month time granularity 306). As shown, these time granularities are coarse when compared to the target time granularity associated with the user of the client device 108a.

For example, the predictive communications distribution system 102 determines label rates based on numbers of electronic communications provided (e.g., send count) and numbers of responses received (e.g., response count). More particularly, to generate label rates given all combinations of attribute groups with user attributes ($UA^{(i)}$) and time granularities ($TG^{(j)}$), where $i \in 0, 1, \ldots, n$; $j \in 0, 1, \ldots, m$, the predictive communications distribution system 102 performs the following determinations:

$$\text{Send Count}_{UA^{(i)}, TG^{(j)}}(UA^{(i)} = UA_p^{(i)}, TG^{(j)} = TG_q^{(j)}) =$$
Total number of electronic communications sent when $UA^{(i)} = UA_p^{(i)}$,
$$TG^{(j)} = TG_q^{(j)};$$

$$\text{Response Count}_{UA^{(i)}, TG^{(j)}}(UA^{(i)} = UA_p^{(i)}, TG^{(j)} = TG_q^{(j)}) =$$
Total number of responses when $UA^{(i)} = UA_p^{(i)}, TG^{(j)} = TG_q^{(j)};$ and $$\text{Label Rate}_{UA^{(i)}, TG^{(j)}}(UA^{(i)} = UA_p^{(i)}, TG^{(j)} = TG_q^{(j)}) =$$
$$\frac{\text{Response Count}_{UA^{(i)}, TG^{(j)}}(UA^{(i)} = UA_p^{(i)}, TG^{(j)} = TG_q^{(j)})}{\text{Send Count}_{UA^{(i)}, TG^{(j)}}(UA^{(i)} = UA_p^{(i)}, TG^{(j)} = TG_q^{(j)})}$$

where $UA_p^{(i)}$ is a specific distinct value of $UA_p^{(i)}$ and $TG_q^{(j)}$ is a specific distinct value of $TG^{(j)}$. The predictive communications distribution system 102 stores Send Count$_{UA^{(i)},TG^{(j)}}$ and Label Rate$_{UA^{(i)},TG^{(j)}}$ at all possible $UA_p^{(i)}$ and $TG_q^{(j)}$ (e.g., within a training database).

In addition, the predictive communications distribution system 102 utilizes a response rate prediction model to generate a user weight 308 associated with the user of the client device 108a and the target time granularity. In addition, the predictive communications distribution system 102 utilizes a response rate prediction model to generate group weights (e.g., group weights 314 and 320) associated with the different combinations of attribute groups and time granularities. Specifically, the predictive communications distribution system identifies the group weight 314 for the group label rate 316 corresponding to the combination of the attribute group 312. Moreover, the predictive communications distribution system identifies the group weight 320 for the group label rate 322 corresponding to the combination of the attribute group 318 and the month time granularity 306.

The predictive communications distribution system 102 further utilizes the response rate prediction model to apply the various weights to the respective label rates in generating a predicted response rate. The predictive communications distribution system 102 can vary weights to emphasize user weights or particular group weights. For instance, in relation to FIG. 3, the predictive communications distribution system 102 determines a user weight 308 that is heavier than the group weights 314 and 320 (as indicated by the larger box) to give more consideration to user-specific data (e.g., the user label rate 310) in generating predicted response rates. In other embodiments (e.g., where samples for the client device 108a are sparse), the predictive communications distribution system 102 can utilize a larger group weight (e.g., the group weight 314 and/or the group weight 320) relative to the user weight 308).

In one or more embodiments, the predictive communications distribution system 102 generates predicted response rates for all possible time values of the target time granularity for every user, as given by:

$$\text{PredictedResponseRate}(\text{user } id, TG^{(target)}) =$$
$$\frac{\sum_{i=0, j=0}^{i=n, j=m} w_{UA^{(i)}, TG^{(j)}} \times \text{Label Rate}_{UA^{(i)}, TG^{(j)}}}{\sum_{i=0, j=0}^{i=n, j=m} w_{UA^{(i)}, TG^{(j)}}}$$

where user id is a user identification and $w_{UA^{(i)}, TG^{(j)}}$ are the weights (e.g., the user weight 308 and the group weights 314 and 320) of the response rate prediction model with respect to each corresponding label rate (e.g., the user label rate 310 and the group label rates 316 and 322). The predictive communications distribution system 102 utilizes the PredictedResponseRate(user id,TG$^{(target)}$) for determining send times for providing electronic communications to the users.

In addition, in some embodiments, the weight for an individual user (e.g., the user weight 308) at the target time granularity represents the actual number of electronic communications provided to the user (i.e., the Send Count$_{UA^{(i)}, TG^{(j)}}$ of the user). The predictive communications distribution system 102 determines other weights such as the group weight 314 and the group weight 320 via training the response rate prediction model, as described in further detail below in relation to FIG. 4. In some embodiments, however, the predictive communications distribution system 102 determines the group weights 314 and 320 by determining send counts (e.g., number of provided electronic communications) associated with the attribute groups 312 and 318, respectively. For example, the predictive communications distribution system 102 determines an average of electronic communications provided to the users of each of the attribute group 312 (the users associated with the client devices 108a, 108b, and 108c) and the attribute group 318 (the users associated with the client devices 108a, 108d, and 108e). In some embodiments, the predictive communications distribution system 102 maintains group weights (e.g., the group weights 314 and 320) at constant values and modifies only the user weight 308 (e.g., to reflect send counts over time).

Figure 4:
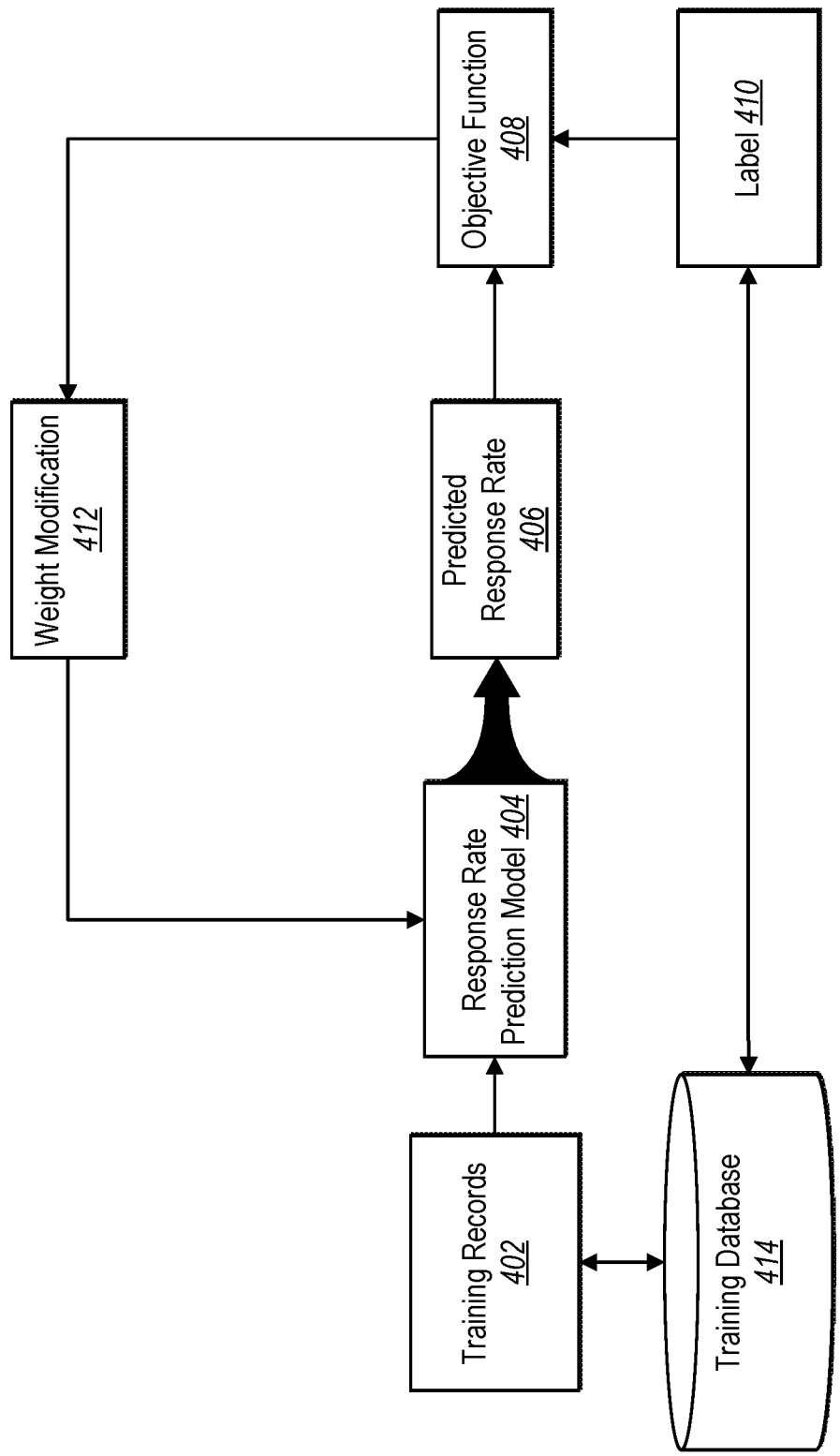
FIG. 4 illustrates an example process for training a response rate prediction model in accordance with one or more embodiments.

As mentioned, the predictive communications distribution system 102 trains one or more response rate prediction models (e.g., the trained response rate prediction models 206). FIG. 4 illustrates an example process by which the predictive communications distribution system 102 trains a response rate prediction model 404 in accordance with one or more embodiments. In some embodiments, the example process illustrated in FIG. 4, along with the accompanying description hereafter, provide corresponding structure for a step for training a response rate prediction model comprising a plurality of weights corresponding to different combinations of time granularities and attribute groups corresponding to the user. As shown, the predictive communications distribution system 102 accesses training records 402 from a training database 414. Indeed, as described in further detail below, the predictive communications distribution system 102 generates and stores training records for individual users.

For each training record (e.g., the training record 402) with a user identification (user id) and a send time, the predictive communications distribution system 102 accesses the training database 414 to look up Send Count$_{UA^{(i)}, TG^{(j)}}$ and Label Rate$_{UA^{(i)}, TG^{(j)}}$ (which are generated and stored as described above) based on matching values of $UA^{(i)}$ for user id and matching values of $TG^{(j)}$ for send time. In addition, the predictive communications distribution system 102 utilizes the response rate prediction model 404 to introduce weights $w_{UA^{(i)}, TG^{(j)}}$. Thus, the predictive communications distribution system 102 utilizes the response rate prediction model 404 to generate a predicted response rate 406 expressed as a convex combination of the Label Rate$_{UA^{(i)}, TG^{(j)}}$ at all possible combinations of time granularities and attribute groups. For example, the response rate prediction model 404 follows a Bayesian formula to generate the predicted response rate 406 by assuming that responses follow a Bernoulli distribution and mean response rates follow a Beta distribution, as given by:

$$PredictedResponseRate(\text{user id, send time}) = \frac{\sum_{i=0,j=0}^{i=n,j=m} w_{UA^{(i)},TG^{(j)}} \times \text{Label } Rate_{UA^{(i)},TG^{(j)}}}{\sum_{i=0,j=0}^{i=n,j=m} w_{UA^{(i)},TG^{(j)}}}$$

where one of $UA^{(i)}$ represents the individual user, and one of $TG^{(j)}$ represents the target time granularity (e.g., a finest time granularity such as hours in a week). The remainder of $UA^{(i)}$ and $TG^{(j)}$ represent attribute groups that include the user and coarser time granularities to act as priors.

Based on the above equation, the response rate prediction model 404 generates a predicted response rate 406. For example, in some embodiments, the response rate prediction model 404 applies a user weight associated with the individual user at the target time granularity as the actual number of electronic communications provided to the user (i.e., the Send $\text{Count}_{UA^{(i)},TG^{(j)}}$ for the user). The other weights are considered variables to the model, and their values will be obtained through a model training process by optimize a loss function. The training process will be elaborated in further detail below. Moreover, in some circumstances the weights $w_{UA^{(i)},TG^{(j)}}$ are held constant once trained. As a result, the response rate prediction model 404 generates the predicted response rate 406 in an asymptotically unbiased fashion in the sense that, as more responses are collected for the target time granularity, likelihood (based on the evidence collected for individual user) weighting will dominate, and the weights of the priors will be relatively smaller, thus resulting in an asymptotic approach to the individual user's own actual response rate at the target time granularity. However, in circumstances when only sparse data are available such as when user responses for the target time granularity (or for particular time values of the target time granularity) are sparse, then the response rate prediction model 404 utilizes the above equation to "borrow" information from coarser time granularities to generate the predicted response rate 406 by weighting them more heavily in relation to the weight associated with the individual user (e.g., by increasing the group weights and/or by decreasing the user weight).

In some embodiments, the user attributes $UA^{(i)}$ and the time granularities $TG^{(j)}$ form a hierarchical structure. To illustrate, $UA^{(0)}$ represents the whole population of users, $UA^{(1)}$ represents a first user attribute (e.g., a country code), $UA^{(2)}$ represents a second user attribute (e.g., a user identification), such that $UA^{(i)}$ for (i=0, 1, 2, ... ) forms a hierarchical structure. Similarly, in some embodiments, $TG^{(j)}$ for (j=0, 1, 2, ... ) also forms a hierarchical structure where $TG^{(0)}$ represents all time granularities, $TG^{(1)}$ represents a finest time granularity, $TG^{(2)}$ represents a coarser time granularity, and so forth. Thus, the response rate prediction model 404 can apply the above equation to generate the predicted response rate 406 in a hierarchical fashion, as given by:

$$PredictedResponseRate(UA^{(i)}, TG^{(j)}) = \frac{w_{UA^{(i-1)},TG^{(j)}} \times PredictedResponseRate(UA^{(i-1)}, TG^{(j)}) + \text{Send Count}_{UA^{(i)},TG^{(j)}} \times \text{Label } Rate_{UA^{(i)},TG^{(j)}}}{w_{UA^{(i-1)},TG^{(j)}} + \text{Send Count}_{UA^{(i)},TG^{(j)}}}.$$

Additionally, the predictive communications distribution system 102 trains the response rate prediction model 404 to learn the weights $w_{UA^{(i)},TG^{(j)}}$. In particular, the predictive communications distribution system 102 utilizes an objective function 408 to determine a measure of discrepancy or consistency between the predicted response rate 406 and a ground truth response rate. For example, the predictive communications distribution system 102 utilizes a series of objective functions 408 to compare predictions of whether or not a user with a particular user identification will provide responses at particular send times with labels (e.g., the label 410) that represent ground truth determinations of whether or not responses were actually received from the user at the send times. Indeed, the predictive communications distribution system 102 accesses the label 410 from the training database 414 as part of training data for training the response rate prediction model 404.

To illustrate, the predictive communications distribution system 102 implements an objective function (e.g., the objective function 408) without loss of generality as given by:

Objective=$L$(PredictedResponseRate(user id,send time,$\{w_{UA^{(i)},TG^{(j)}}\}$),Label)

where L represents a loss function, PredictedResponseRate (user id, send time, $\{w_{UA^{(i)},TG^{(j)}}\}$,) represents a prediction of the probability a user with the user id will provide a response (user's response rate) at the send time, and PredictedResponseRate is also a function of $\{w_{UA^{(i)},TG^{(j)}}\}$, which are the set of weights associated all possible user attributes and time granularities, and Label represents a ground truth actuality of whether or not the user provided a response at the send time. Note that as for the input parameters of objective function, only weights are variable, and all the other parameters are fixed, since they are all data observations. The training process is to optimize (minimize or maximize) the objective function by varying the values of weights. Because the Label is binary, the predictive communications distribution system 102 can utilize a variety of possible objective functions to determine a measure of loss such as a cross entropy loss function (i.e., logistic loss), an area under receiver operating characteristic (AUC of ROC) curve loss function, an average AUC of ROC loss function for an individual user, a precision function, a recall function, or an F-1 score function. In embodiments where it is possible for the predictive communications distribution system 102 to determine a gradient of the objective function with respect to weights 408, the predictive communications distribution system 102 utilizes gradient-based approaches such as gradient descent, stochastic gradient descent, or Newton methods to optimize the object function 408. In embodiments where it is impossible for the predictive communications distribution system 102 to determine a gradient of the objective function 408, however, the predictive communications distribution system 102 utilizes a grid search, a stochastic parameter search (by stochastically varying the weights to find maximum or minimum of the objective function), or another combinatorial approach to optimizing the objective function 408.

Based on utilizing the objective function 408, the predictive communications distribution system 102 further performs a weight modification 412. In particular, the predictive communications distribution system 102 modifies one or more of the weights $w_{UA^{(i)},TG^{(j)}}$ associated with the response rate prediction model 404. For example, the predictive communications distribution system 102 modifies the weights by holding a user weight as original counts of communications in targeted time granularity and/or varying one or more group weights to reduce the measure of loss determined by the objective function 408. In response to modifying one or more of the weights $w_{UA^{(i)},TG^{(j)}}$, the predictive communications distribution system 102 utilizes the response rate prediction model 404 to generate a new predicted response rate based on a new training record. The predictive communications distribution system 102 repeats the process of applying the objective function 408, modifying the weights to reduce loss, and generating new predicted response rates to improve the accuracy of the response rate prediction model 404. The predictive communications distribution system 102 can constantly (or at certain time intervals) train the response rate prediction model 404. In particular, the predictive communications distribution system 102 can predict responses, the predictive communications distribution system 102 can send electronic communications and monitor responses, then utilize the observed responses as ground truth to train the response rate prediction model 404.

Figure 5:
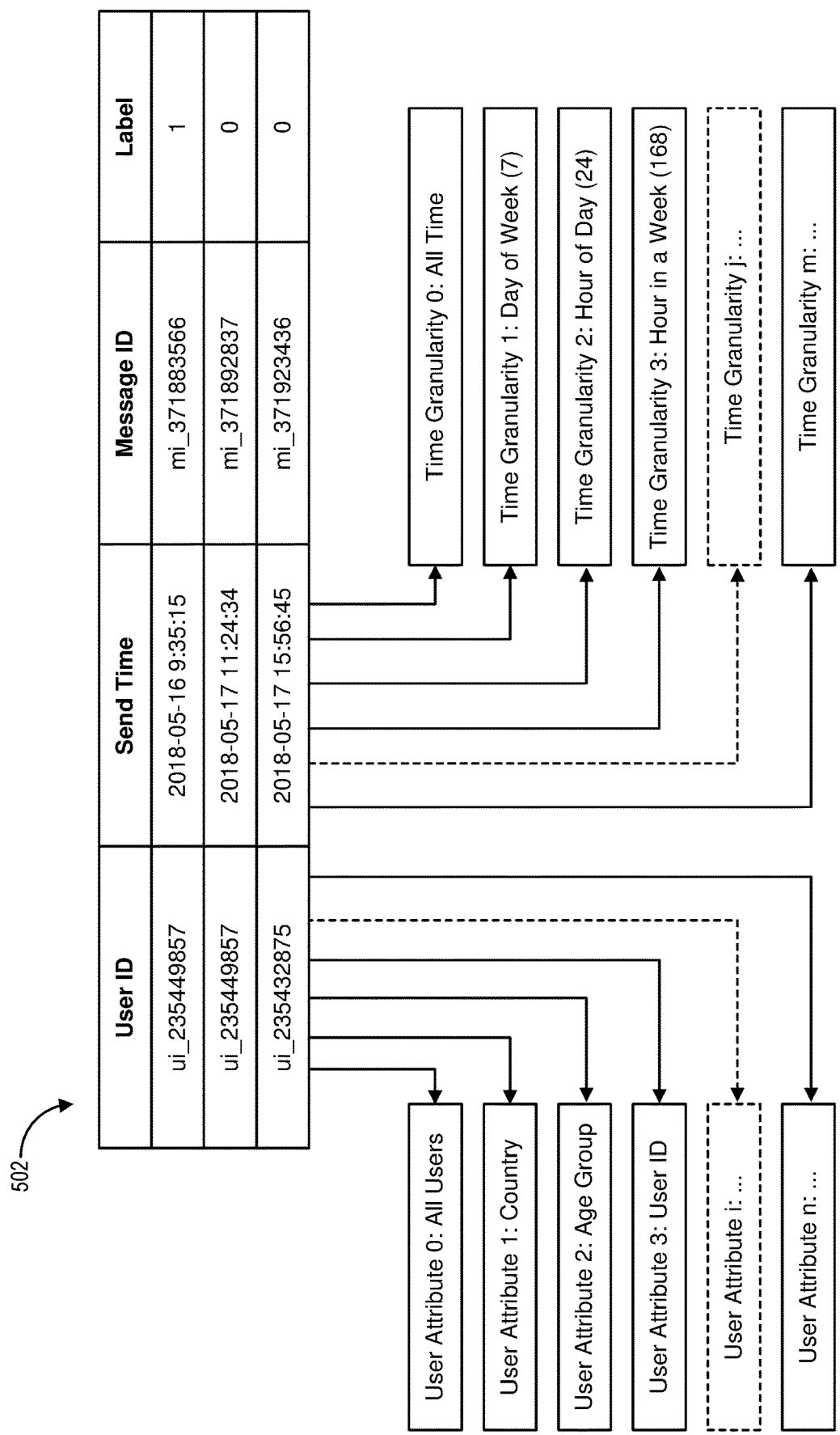
FIG. 5 illustrates an example table of training data for training a response rate prediction model in accordance with one or more embodiments.

As mentioned, the predictive communications distribution system 102 utilizes training data to train response rate prediction models (e.g., the response rate prediction model 404). FIGS. 5 and 6 illustrate example training data that the predictive communications distribution system 102 generates in accordance with one or more embodiments. As shown in FIG. 5, the predictive communications distribution system 102 pulls raw message delivery and tracking log data recorded as part of the electronic communication distribution manager 202 for a period of time. For example, the predictive communications distribution system 102 logs events associated with electronic communications such as when an electronic communication is sent, opened, clicked, and leads to a conversion. Indeed, the predictive communications distribution system 102 tracks event types (e.g., open, click, conversion), message identifications, user identifications, and timestamps for send times associated with electronic communication.

FIG. 5 illustrates a table 502 including various data fields that the predictive communications distribution system 102 logs with respect to various electronic communications, such as a user ID field that indicates a user identification for users to whom electronic communications are provided, a send time field indicating a time the electronic communication is transmitted to client devices associated with the users (e.g., client devices 108a-108n), a message ID indicating an identification of the provided electronic communication, and a label field indicating whether the user responded to the electronic communication (e.g., 1 for yes, 0 for no). As shown in FIG. 5, the predictive communications distribution system 102 determines further training data based on the information in the table 502. For example, the predictive communications distribution system 102 determines user attributes associates with the various user identifications. In addition, the predictive communications distribution system 102 determines various time granularities associated with the various send times of the electronic communications.

As illustrated, the predictive communications distribution system 102 determines a user attribute 0 ($UA^{(0)}$) which represents all users associated with the predictive communications distribution system 102. The predictive communications distribution system 102 further determines a user attribute 1 ($UA^{(1)}$) which represents a country associated with a particular user. The predictive communications distribution system 102 further determines a user attribute 2 ($UA^{(2)}$) which represents an age group (e.g., ages 21-25) associated with a user. Likewise, for other user attributes such as user identifications, user interests, user gender, etc., the predictive communications distribution system 102 determines user attributes associated with various users. Indeed, in some embodiments, the user attribute 3 ($UA^{(3)}$) represents a user identification and is the finest-level user attribute to describe individual users, while user attribute 0 is the coarsest-level user attribute to describe individual users.

As further illustrated in FIG. 5, the predictive communications distribution system 102 determines time granularities such as a time granularity 0 ($TG^{(0)}$) which represents all time granularities, a time granularity 1 ($TG^{(1)}$) which represents a first time granularity (e.g., days in a week), a time granularity 2 ($TG^{(2)}$) which represents a second time granularity (e.g., hours in a day), and a time granularity 3 ($TG^{(3)}$) which represents a third time granularity (e.g., hours in a week). As shown, time granularity 3 is the finest time granularity of those in FIG. 5, while time granularity 0 is the coarsest. Additionally, the predictive communications distribution system 102 determines additional time granularities beyond those specifically shown in FIG. 5, some of which can be coarser than those illustrated and some of which can be finer.

Based on extending the training data to generate user attributes and time granularities as shown in FIG. 5, the predictive communications distribution system 102 generates a training data table 602, as illustrated in FIG. 6. Indeed, FIG. 6 illustrates a table 602 of training data that includes user identifications, send times, various user attributes (coarsest to finest), various time granularities (from coarsest to finest), and a binary label. Thus, based on generating the information within the table 602, the predictive communications distribution system 102 determines various parameters associated with electronic communications provided to users. Based on the information within the table 602, the predictive communications distribution system 102 generates predicted response rates for individual users at particular send times over a target time granularity (e.g., the finest time granularity).

Figure 7:
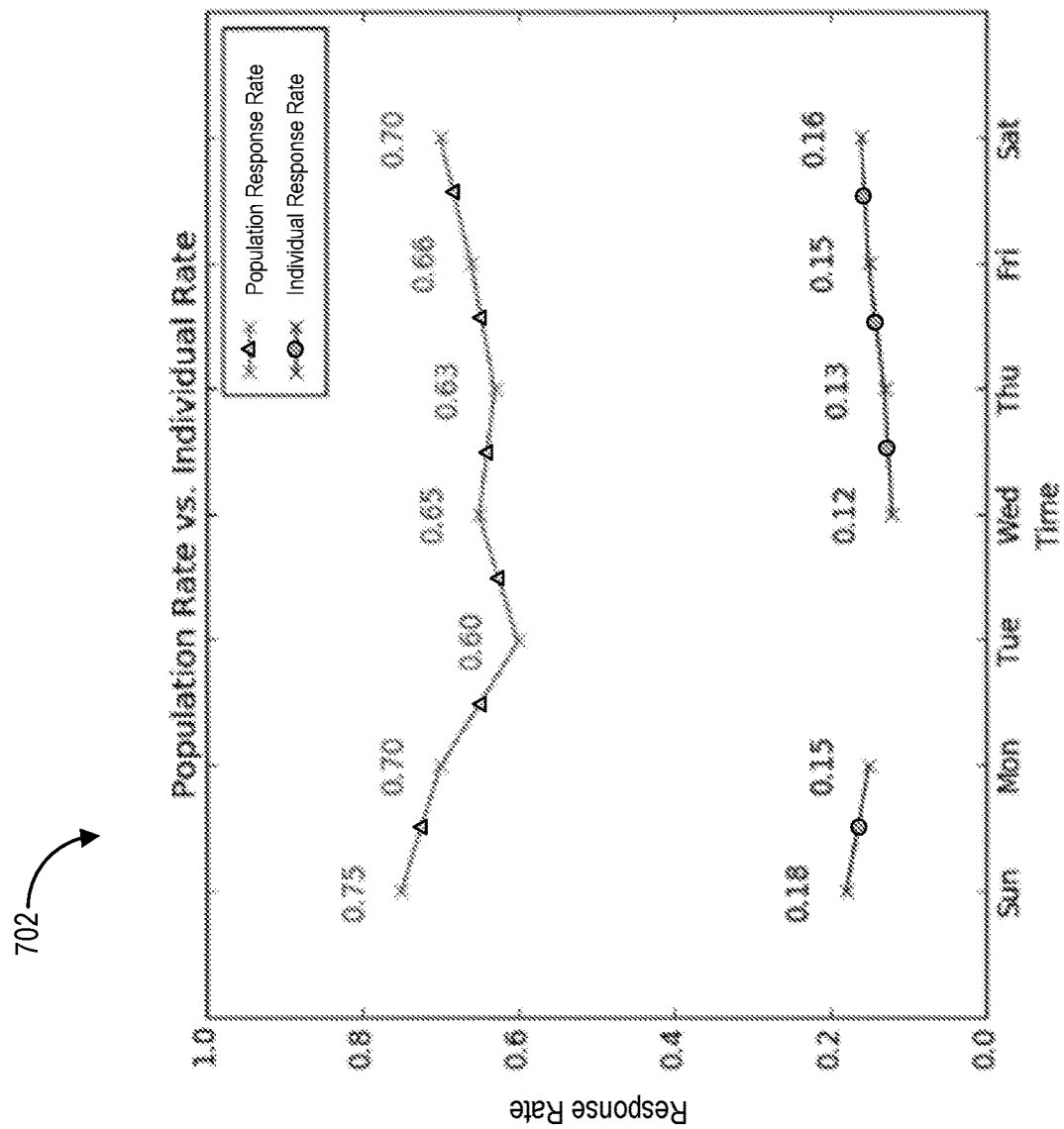
FIG. 7 illustrates an example graph for supplementing user response information with population response information in accordance with one or more embodiments.

As mentioned above, in some embodiments the predictive communications distribution system applies constraint regression and Bayesian smoothing to more accurately determine label rates for a target time granularity from different populations that may reflect different scales. FIG. 7 illustrates an example chart 702 that illustrates a representation of population response rates and user response rates over a particular time granularity of days in a week. As shown in FIG. 7, the user response rate has sparse data (i.e., few or no recorded responses) for Tuesday, which the predictive communications distribution system 102 compensates for by "borrowing" data from the population and by using various tuning techniques.

For instance, to reduce artificial variation due to sparse observations of responses in certain time values ($TG^{(i)}$) of a time granularity $TG_q^{(j)}$, the predictive communications distribution system 102 applies a Bayesian smoothing factor in determining the Label Rate$_{UA^{(i)},TG^{(j)}}$, as given by:

$$\text{Label Rate}_{UA^{(i)},TG^{(j)}}(UA^{(i)} = UA_p^{(i)}, TG^{(j)} = TG_q^{(j)}) =$$

$$\frac{\text{Response Count}_{UA^{(i)},TG^{(j)}}(UA^{(i)} = UA_p^{(i)}, TG^{(j)} = TG_q^{(j)}) + \alpha \times \text{Label Rate}_{UA^{(i)}}}{\text{Send Count}_{UA^{(i)},TG^{(j)}}(UA^{(i)} = UA_p^{(i)}, TG^{(j)} = TG_q^{(j)}) + \alpha}$$

where α is the smoothing factor which can be chosen to maximize test data performance and Label Rate$_{UA^{(i)}}$ is the label rate for an attribute group (e.g., the attribute group 312), regardless of time granularity TG$^{(j)}$ (e.g., the time granularity 304). Given the above equation, when Send Count$_{UA^{(i)},TG^{(j)}}$ (UA$^{(i)}$=UA$_p^{(i)}$,TG$^{(j)}$=TG$_q^{(j)}$) is much smaller than α, Label Rate$_{UA^{(i)},TG^{(j)}}$ will asymptotically approach Label Rate$_{UA^{(i)}}$.

In addition to reducing artificial variation due to sparse responses, the predictive communications distribution system 102 further reduces bias due to "borrowing" a Label Rate$_{UA^{(i)},TG^{(j)}}$ of an attribute group for an individual user's Label Rate$_{UA^{(user\ id)},TG^{(j)}}$. To reduce artificial variation, the predictive communications distribution system 102 scales the Label Rate$_{UA^{(i)},TG^{(j)}}$ of the attribute group (e.g., the attribute group 312 or 318) so that its mean matches the mean of the Label Rate$_{UA^{(user\ id)},TG^{(j)}}$ of the individual user.

Furthermore, to address the problem of inaccurate send time determinations that can result when borrowing data (e.g., such as in cases where directly applying the Bayesian formula would result in an inaccurate determination of Tuesday being the best send time for the user in FIG. 7, where the user has never previously responded to an electronic communication on a Tuesday), the predictive communications distribution system 102 utilizes a constrained optimization method which transforms the population rates so that the mean response rate of the population matches the mean response rate of the individual user. For example, let $y_i$(i=1, 2, . . . , 7) be the label rate for the population, let $\bar{y}$ be the mean response rate of the population, and let C be the mean response rate of the individual user. The predictive communications distribution system 102 thus solves for α and β in the following constrained optimization problem:

$$\min_{\alpha,\beta} \sum_i [(\alpha \cdot y_i + \beta) - y_i]^2$$

$$st.\ \alpha \cdot \bar{y} + \beta = C$$

$$0 \leq \alpha \cdot y_i + \beta \leq 1\ (i = 1, 2, \ldots, 7)$$

$$\alpha \geq 0$$

where $\alpha \cdot y_i + \beta \leq 1$(i=1, 2, . . . , 7) represents the population rates after the transformation.

In some embodiments, the predictive communications distribution system 102 looks for a linear transformation which will move the mean response rate of the population to the mean response rate of the individual user with as little distortion to original population profile as possible. The second and third constraints above ensure that the response rates are between 0 and 1, and relative ranking is preserved after the transformation. In addition, the above optimization problem is a quadratic problem which the predictive communications distribution system 102 solves for each individual user, which, in some embodiments, numbers in the millions of users. As a result of the large numbers of users, generic or conventional solvers of the optimization problem are infeasible because of the computationally-intensive nature of such extensive computations. To overcome this problem, the predictive communications distribution system 102 utilizes a closed-form solution, as given by:

$$\alpha_{opt} = \min\left\{1, \frac{1-C}{\max_{y_i > \bar{y}}(y_i - \bar{y})}, \frac{C}{\max_{y_i < \bar{y}}(\bar{y} - y_i)}\right\}$$

$$\beta_{opt} = C - \alpha_{opt} \cdot \bar{y}$$

where $\bar{y}$ is the mean response rate of the population. The predictive communications distribution system 102 determines an estimate of $\bar{y}$, which, in some embodiments, may not be the same as the arithmetic mean of $y_i$.

Communication sending time for individual users, a subpopulation, or even the whole population can be under-explored, and model will never reliably learn, if at all, response rate in those under-explored time slots. The response rate by send time prediction can be considered as multi-armed bandit problem, since each time can be considered as an arm of the bandit, and response rate in that time can be considered as the return of that arm. Typical multi-armed bandit problem solutions can all be used to solve exploration and exploitation of sending time optimization problem. For simplicity, here we only demonstrate how to apply UCB approach, however, other bandit algorithms, such as Thompson Sampling and etc., can achieve similar results in balancing exploration and exploitation. As mentioned, the predictive communications distribution system 102 utilizes a Bayes UCB model (e.g., the Bayes UCB model 210) to determine send times for providing electronic communications within a target time granularity. To illustrate, the predictive communications distribution system 102 adapts the Bayes UCB model for finite-horizon analysis to balance exploration and exploitation. In some embodiments, the predictive communications distribution system 102 performs only exploration (e.g., by choosing the highest ranked send times based on response rates) at the beginning of its analysis of send times because, near the beginning, the predictive communications distribution system 102 has few user responses and borrows more information from the population at coarser time granularities and coarser attribute granularities. Thus, the predictive communications distribution system 102 improves its analysis by determining exploratory send times to provide electronic communications at times with relatively few user responses. To determine send times (e.g., by balancing exploration and exploitation), the predictive communications distribution system 102 performs the following algorithm for each user:

---
Algorithm 1—Bayes UCB
Require: n (total number of electronic communications to be sent)
For t = 1 to n, do:
    For all time values j in the target time granularity, do:

Compute $q_j(t) = Q\left(1 - \frac{1}{t}, \lambda_j^{t-1}\right)$

Send electronic communication at send time $l_t$ = argmax$_j q_j(t)$
    Get reward and update $\lambda_j^{t-1}$ to $\lambda_j^t$

---

By treating response rate by send time prediction as bandit problem, and utilizing the Bayes UCB model, the predictive communications distribution system 102 increases exploration in scenarios when user responses are sparse. Based on the target time granularity, the predictive communications distribution system 102 utilizes the Bayes UCB model to determine a send time that gives the highest metric value for every user in accordance with the above algorithm 1. For instance, the predictive communications distribution system 102 utilizes the Bayes UCB model to determine quantile scores for various time values within a target time granularity. Indeed, the predictive communications distribution system 102 utilizes the Bayes UCB model to determine quantile scores as described in Emilie Kaufmann, Olivier Cappé, and Aurélien Garivier, *On Bayesian Upper Confidence Bounds for Bandit Problems*, LTCI, CNRS & Telecom ParisTech, 592-600 (2012), which is incorporated herein by reference in its entirety.

Indeed, the predictive communications distribution system 102 determines a first quantile score for a first time value (e.g., a first potential send time) within a target time granularity, a second quantile score for a second time value (e.g., a second potential send time) within the target time granularity, and so forth for all time values of the target time granularity. The Bayes UCB model determines quantile scores based on predicted response rates in conjunction with a number of electronic communications provided to users at various time values. Based on comparing the quantile scores, the predictive communications distribution system 102 further determines which time value to recommend as a send time. For example, the predictive communications distribution system 102 ranks the time values of the target time granularity according to respective quantile scores. In some embodiments, the predictive communications distribution system 102 selects a time value that corresponds to a highest ranking (i.e., a highest quantile score) as the send time for providing electronic communications to the given user. Effectively, UCB approach will send more communications to time where the response rate prediction is high and reliable (based on more observations), or to time where response rate prediction is not as high but highly unreliable (based on very few observations), thus fulfill balancing exploration (to explore in the uncertain areas) and exploitation (to act based on highly confident predictions).

Based on determining send times, the predictive communications distribution system 102 provides additional electronic communications to users. In addition, the predictive communications distribution system 102 receives additional responses in relation to the additional electronic communications. Based on the additional provided electronic communications and the additional received responses, the predictive communications distribution system 102 modifies the weights associated with response rate prediction models (e.g., the response rate prediction models 206). For instance, based on receiving more responses from a given user, the predictive communications distribution system 102 increases a user weight (e.g., a user weight 308) associated with a user label rate (e.g., the user label rate 310) of the user at a target time granularity (e.g., the day time granularity 302). In addition (or alternatively), the predictive communications distribution system 102 decreases group weights (e.g., group weights 314 and/or 320) associated with group label rates (e.g., group label rates 316 and/or 322) of attribute groups (e.g., attribute groups 312 and/or 318) at coarser time granularities (e.g., the week time granularity 304 and/or the month time granularity 306). In some embodiments, however, the predictive communications distribution system 102 does the opposite by increasing group weights (e.g., the group weights 314 and/or 320) and/or decreasing the user weight (e.g., the user weight 308). As mentioned, in some embodiments, the predictive communications distribution system 102 alternatively maintains some weights (e.g., group weights 314 and/or 320) at constant values and modifies other weights (e.g., the user weight 308).

Figure 8:
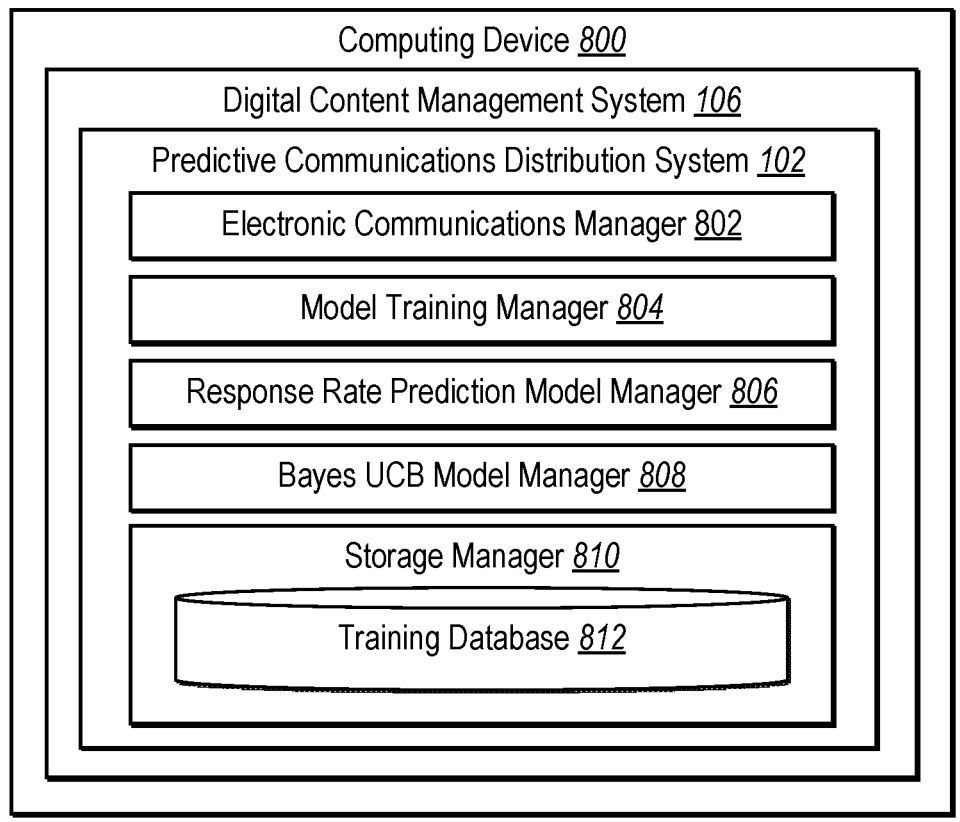
FIG. 8 illustrates a schematic diagram of a predictive communications distribution system in accordance with one or more embodiments.

Looking now to FIG. 8, additional detail will be provided regarding components and capabilities of the predictive communications distribution system 102. Specifically, FIG. 8 illustrates an example schematic diagram of the predictive communications distribution system 102 on an example computing device 800 (e.g., one or more of the client devices 108a-108n, the administrator device 114, and/or the server(s) 104). As shown in FIG. 8, the predictive communications distribution system 102 may include an electronic communications manager 802, a model training manager 804, a response rate prediction model manager 806, a Bayes UCB model manager 808, and a storage manager 810.

As just mentioned, the predictive communications distribution system 102 includes an electronic communication manager 802. In particular, the electronic communication manager 802 manages, generates, accesses, and/or provides electronic communications to users. For example, the electronic communications manager 802 provides electronic communications to users based on send times. In addition, the electronic communications manager 802 accesses, detects, and/or receives responses from users. Further, the electronic communications manager 802 determines, identifies, and/or extracts various information or parameters form electronic communications and/or responses. For example, the electronic communications manager 802 extracts parameters such as user attributes of users to whom electronic communications are sent, send times of electronic communications, and other parameters as described herein. Indeed, the electronic communications manager 802 communicates with other components of the predictive communications distribution system 102 such as the storage manager 810 to access and/or store information associated with electronic communications within the training database 812.

As shown, the predictive communications distribution system 102 further includes a model training manager 804. In particular, the model training manager 804 trains or tunes one or more response rate prediction models to generate predicted response rates. For example, the model training manager 804 communicates with the storage manager 810 to access training data from the training database 812, including training electronic communications and training responses. Based on the training data, the model training manager 804 trains the response rate prediction models to generate accurate response rate predictions for individual users by utilizing an objective function and/or modifying weights associated with the response rate prediction models.

As further shown in FIG. 8, the predictive communications distribution system 102 includes a response rate prediction model manager 806. In particular, the response rate prediction model manager 806 utilizes, implements, or applies one or more trained response rate prediction models to generate predicted response rates. For instance, the response rate prediction model manager 806 generates predicted response rates for each individual user. Ad described above, the response rate prediction model manager 806 can determine, for each user, user label rates, user weights, user attribute groups, group label rates (corresponding to different combinations of attribute groups and time granularities), and attribute group weights. The response rate prediction model manager 806 can then determine a response rate by generating a weighted combination of the user label rates and the group label rates.

Additionally, the predictive communications distribution system 102 includes a Bayes UCB model manager 808. In particular, the Bayes UCB model manager 808 manages, utilizes, applies, or implements a Bayes UCB model to determine send times for providing electronic communications to users. For example, the Bayes UCB model manager 808 implements a Bayes UCB algorithm to balance exploration and exploitation considerations in conjunction with predicted response rates for individual users to then determine send times to provide electronic communications. Based on providing additional electronic communications according to determined send times, the Bayes UCB model manager 808 communicates with the model training manager 804 and/or the response rate prediction model manager 806 to modify weights associated with one or more response rate prediction models to update response rate predictions (and, in turn, determined send times) based on the additional electronic communications and any resultant responses from users.

In one or more embodiments, each of the components of the predictive communications distribution system 102 are in communication with one another using any suitable communication technologies. Additionally, the components of the predictive communications distribution system 102 can be in communication with one or more other devices including one or more client devices described above. It will be recognized that although the components of the predictive communications distribution system 102 are shown to be separate in FIG. 8, any of the subcomponents may be combined into fewer components, such as into a single component, or divided into more components as may serve a particular implementation. Furthermore, although the components of FIG. 8 are described in connection with the predictive communications distribution system 102, at least some of the components for performing operations in conjunction with the predictive communications distribution system 102 described herein may be implemented on other devices within the environment.

The components of the predictive communications distribution system 102 can include software, hardware, or both. For example, the components of the predictive communications distribution system 102 can include one or more instructions stored on a computer-readable storage medium and executable by processors of one or more computing devices (e.g., the computing device 800). When executed by the one or more processors, the computer-executable instructions of the predictive communications distribution system 102 can cause the computing device 800 to perform the methods described herein. Alternatively, the components of the predictive communications distribution system 102 can comprise hardware, such as a special purpose processing device to perform a certain function or group of functions. Additionally or alternatively, the components of the predictive communications distribution system 102 can include a combination of computer-executable instructions and hardware.

Furthermore, the components of the predictive communications distribution system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the predictive communications distribution system 102 may be implemented as part of a stand-alone application on a personal computing device or a mobile device. Alternatively or additionally, the components of the predictive communications distribution system 102 may be implemented in any application that allows creation and delivery of marketing content to users, including, but not limited to, applications in ADOBE CREATIVE CLOUD or ADOBE MARKETING CLOUD, such as ADOBE ILLUSTRATOR, ADOBE PHOTOSHOP, ADOBE CAMPAIGN, and ADOBE ANALYTICS. "ADOBE," "ILLUSTRATOR," "PHOTO SHOP," "CAMPAIGN," and "ANALYTICS" are registered trademarks of Adobe Inc. in the United States and/or other countries.

FIGS. 1-8, the corresponding text, and the examples provide a number of different systems, methods, and non-transitory computer readable media for determining send times for providing electronic communications based on predicted response rates of individual users. In addition to the foregoing, embodiments can also be described in terms of flowcharts comprising acts for accomplishing a particular result. For example, FIG. 9 illustrates a flowchart of an example sequence of acts in accordance with one or more embodiments.

Figure 9:
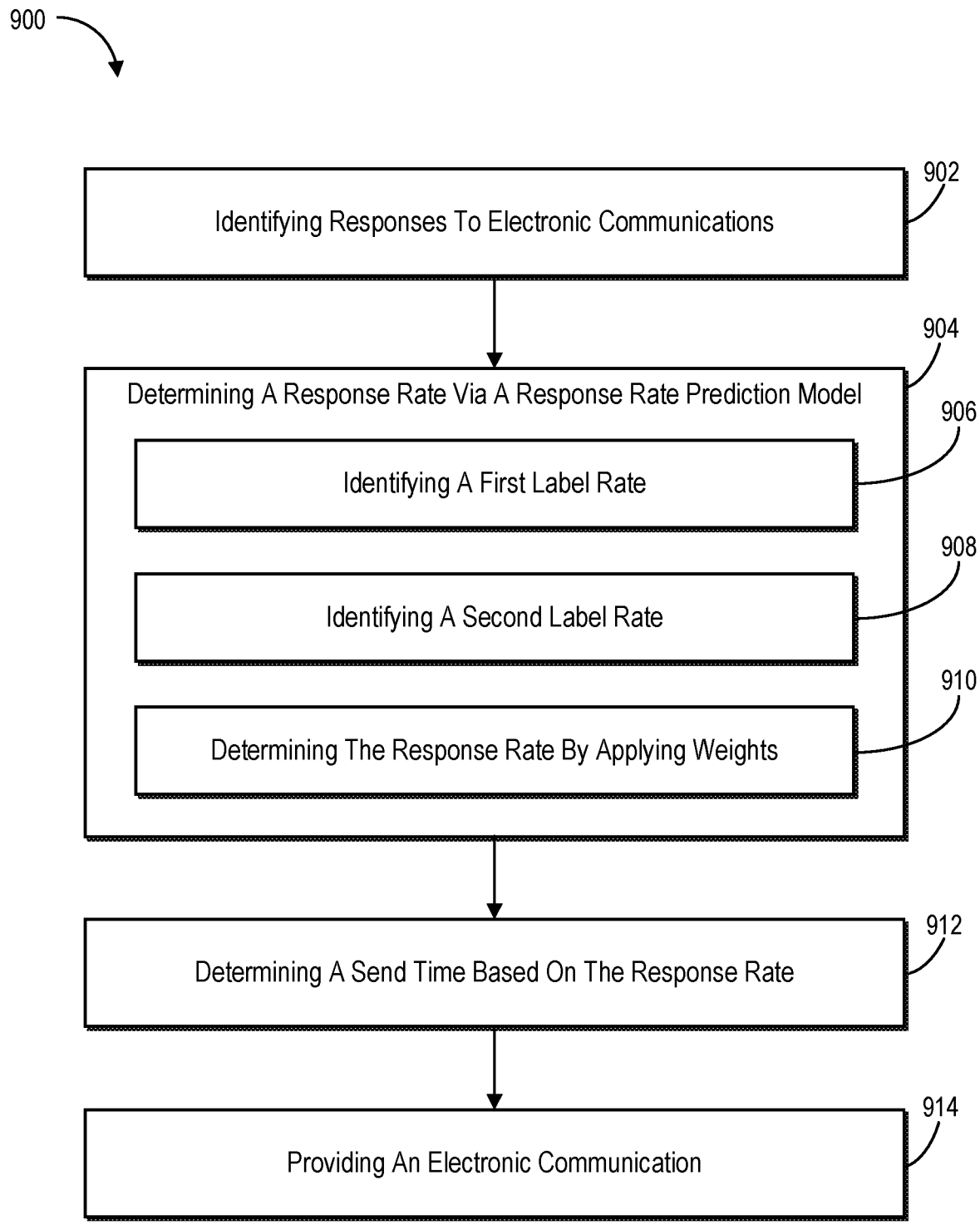
FIG. 9 illustrates a flowchart of a series of acts for determining send times for providing electronic communications to users in accordance with one or more embodiments.

While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9. Additionally, the acts described herein may be repeated or performed in parallel with one another or in parallel with different instances of the same or other similar acts.

FIG. 9 illustrates an example series of acts 900 for providing an electronic communication to a user based on a determined send time. As illustrated, the series of acts 900 includes an act 902 of identifying responses to electronic communications. In particular, the act 902 includes identifying one or more responses to a plurality of electronic communications transmitted to a user.

As shown, the series of acts also includes an act 904 of determining a response rate via a response rate prediction model. In particular, the act 904 includes determining a response rate at a target time granularity via a response rate prediction model. The series of acts 900 can include an act of determining, via the response rate prediction model, predicted response rates associated with a plurality of time values within the target time granularity.

Additionally, the act 904 can further include a series of additional acts such as an act 906 of identifying a first label rate. In particular, the act 906 includes identifying a first label rate corresponding to a first coarse time granularity and a first attribute group comprising the user. The act 906 can involve determining a relationship between a number of responses associated with first attribute group and a number of electronic communications provided to the first attribute group. In addition, the act 906 can involve determining an initial first label rate based on a number of responses corresponding to the first coarse time granularity and the first attribute group and a number of electronic communications sent to the first attribute group in relation to the first coarse time granularity. The act 906 can also involve applying a Bayesian smoothing factor to the initial first label rate to generate a smoothed label rate. Further, the act 906 can involve determining an initial first label rate based on a number of responses corresponding to the first coarse time granularity and the first attribute group and a number of electronic communications sent to the first attribute group in relation to the first coarse time granularity, and can further involve an act of scaling the initial first label rate based on a mean of the one or more responses to the plurality of electronic communications transmitted to the user.

The act 904 can further involve an act 908 of identifying a second label rate. In particular, the act 908 includes identifying a second label rate corresponding to a second coarse time granularity and a second attribute group comprising the user. The act 908 can involve determining a relationship between a number of responses associated with second attribute group and a number of electronic communications provided to the second attribute group.

Further still, the act 904 can include an act 910 of determining the response rate by applying weights. In particular, the act 910 includes determining the response rate at the target time granularity by applying a user weight to the one or more responses, a first weight to the first label rate, and a second weight to the second label rate. A user weight can include a quantity of the plurality of electronic communications transmitted to the user.

As illustrated, the series of acts 900 includes a further act 912 of determining a send time based on the response rate. In particular, the act 912 includes determining a send time based on the response rate utilizing a Bayes upper-confidence-bound send time model. A send time can include a time to provide the electronic communication to the user and that has a highest response rate from among the plurality of time values within the target granularity.

Further, the series of acts 900 includes an act 914 of providing an electronic communication. In particular, the act 914 includes providing an electronic communication to the user based on the send time.

Although not illustrated in FIG. 9, the series of acts 900 can include an act of identifying one or more additional responses to the additional electronic communications provided to the user, and can further include an act of, based on the one or more additional responses, modifying one or more of the plurality of weights corresponding to the different combinations of the time granularities and the attribute groups corresponding to the user. The series of acts 900 can further include an act of utilizing a response rate prediction model to generate a predicted response rate, wherein the predicted response rate comprises one or more of an open rate, a click rate, or a conversion rate. In addition, the series of acts 900 can include an act of receiving an input from an administrator device to define the response rate as one or more of the open rate, the click rate, or the conversion rate.

Additionally, the series of acts 900 can include an act of identifying one or more additional responses to additional electronic communications provided to the user as well as an act of, based on the one or more additional responses, reduce the first weight corresponding to the first coarse time granularity and the first attribute group including the user and the second weight corresponding to the second coarse time granularity and a second attribute group comprising the use. The series of acts 900 can still further include an act of, based on the one or more additional responses, increasing the user weight applied to the one or more responses.

Further, the series of acts 900 can include an act of determining, utilizing the Bayes upper-confidence-bound send time model, a first quantile score for a first send time based on a predicted response rate for the first send time and a number of messages the user has received at the first send time. In addition, the series of acts can include an act of determining, utilizing the Bayes upper-confidence-bound send time model, a second quantile score for a second send time based on a predicted response rate for the second send time and a number of messages the user has received at the second send time. Additionally still, the series of acts 900 can include an act of selecting the send time by comparing the first quantile score and the second quantile score.

The series of acts 900 can also include an act of training a response rate prediction model. In particular, the act of training the response rate prediction model can include various acts, such as identifying a user label rate corresponding to a user for a time granularity. Training the response rate prediction model can also include acts of determining, for a first coarse time granularity and a first attribute group including the user, a first label rate and determining, for a second coarse time granularity and a second attribute group including the user, a second label rate. Additionally, training the response rate prediction model can include an act of generating a predicted response rate associated with the user for the first time granularity based on a first combination of the user label rate and a user weight, a second combination of the first label rate and a first weight, and a third combination of the second label rate and a second weight. Further, training the response rate prediction model can include an act of modifying at least one of the user weight, the first weight, or the second weight based on comparing the predicted response rate and a ground truth response rate associated with the user.

Training the response rate prediction model can further include an act of utilizing an optimization function to compare the predicted response rate and the ground truth response rate to determine a measure of loss associated with the response rate prediction model. Additionally, modifying the at least one of the user weight, the first weight, or the second weight can reduce the measure of loss associated with the response rate prediction model.

Additionally, the response rate prediction model can include determining the first label rate corresponding to the first coarse time granularity and the first attribute group including the user by determining an initial first label rate based on a number of responses corresponding to the first coarse time granularity and the first attribute group and a number of electronic communications sent to the first attribute group in relation to the first coarse time granularity. Further, the response rate prediction model can include an act of determining the first label rate corresponding to the first coarse time granularity and the first attribute group including the user by scaling the initial first label rate based on a mean of the one or more responses to the plurality of electronic communications transmitted to the user.

As mentioned, the predictive communications distribution system 102 can perform a step for determining a send time via the response rate prediction model and the plurality of weights corresponding to the different combinations of the time granularities and the attribute groups corresponding to the user. Indeed, FIG. 10 illustrates an example series of acts 1002-1012 for performing a step for determining a send time via the response rate prediction model and the plurality of weights corresponding to the different combinations of the time granularities and the attribute groups corresponding to the user.

Figure 10:
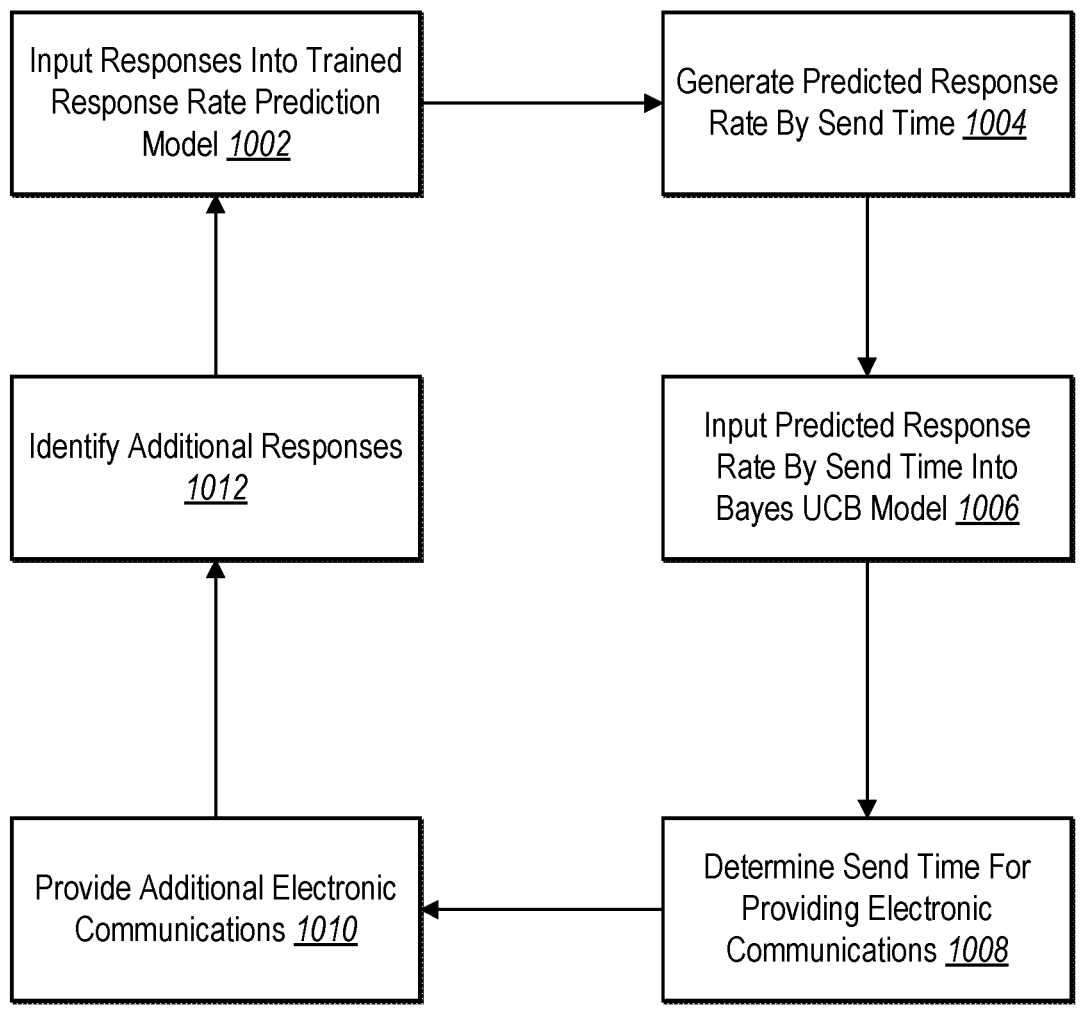
FIG. 10 illustrates a flowchart of a series of acts in a step for determining a send time via the response rate prediction model and the plurality of weights corresponding to the different combinations of the time granularities and the attribute groups corresponding to the user.

As illustrated in FIG. 10, the predictive communications distribution system 102 performs an act 1002 to input responses into a trained response rate prediction model. In particular, the predictive communications distribution system 102 receives and identifies responses associated with provided electronic communications. The predictive communications distribution system 102 further utilizes the received responses as input for one or more response rate prediction models (e.g., the response rate prediction models 206). The predictive communications distribution system 102 further determines parameters such as user attributes and times associated with the received responses and/or the provided electronic communications to utilize as input for the response rate prediction models.

As also illustrated in FIG. 10, the predictive communications distribution system 102 performs an act 1004 to generate a predicted response rate (or multiple predicted response rates) by send time. In particular, the predictive communications distribution system 102 utilizes one or more response rate prediction models to generate predictions of response rates for individual users. For example, the predictive communications distribution system 102 utilizes a response rate prediction model as described above to determine a predicted response rate for each time value over a target time granularity. Indeed, the response rate prediction model generates a user weight and a user label rate for each individual user over a target time granularity, and further generates group weights and group label rates for attribute groups that include the user and for time granularities that are coarser than the target time granularity. Thus, the response rate prediction model generates a predicted response rate based on a weighted combination of the various label rates—i.e., the user label rate and the attribute group label rates.

Additionally, the predictive communications distribution system 102 performs an act 1006 to input the predicted response rate(s) by send time into a Bayes UCB model. In particular, the predictive communications distribution system 102 utilizes the output of the response rate prediction model as input for the Bayes UCB model (e.g., the Bayes UCB model 210). Based on the input predicted response rate and other input parameters (as described above), the Bayes UCB model generates quantile scores for individual time values over the target time granularity. In some embodiments, the Bayes UCB model further ranks the time values according to quantile scores and sets the highest-ranked time value (e.g., the time value with the highest quantile score) as a send time for providing electronic communications. Indeed, the predictive communications distribution system 102 performs an act 1008 to determine a send time for providing electronic communications. In particular, as mentioned, the predictive communications distribution system 102 determines a send time from among a plurality of potential send times represented by time values over a target time granularity. The predictive communications distribution system 102 utilizes a Bayes UCB model to determine the send times based not only on predicted response rates, but further based on balancing exploration and exploitation considerations, as described herein.

Although not illustrated in FIG. 10, in some embodiments, the predictive communications distribution system 102 determines send times utilizing a model other than a Bayes UCB model. For example, the predictive communications distribution system 102 utilizes a ranking model to rank time values across a target time granularity based on predicted response rates. To elaborate, with respect to a given user, the predictive communications distribution system 102 ranks each respective time value over a target time granularity based on the predicted response rates 208. In these or other embodiments, the predictive communications distribution system 102 utilizes a ranking model to select a time value with a highest predicted response rate as the send time for providing electronic communications to the user.

As further illustrated, the predictive communications distribution system 102 performs an act 1010 to provide additional electronic communications. In particular, the predictive communications distribution system 102 provides additional electronic communications to users based on the send time. Indeed, the predictive communications distribution system 102 provides electronic communications at the determined send time and further performs an act 1012 to identify additional responses. In particular, the predictive communications distribution system 102 receives and identifies responses associated with the additional provided electronic communications. Based on the additions responses, the predictive communications distribution system 102 further modifies weights associated with the response rate prediction models to update the predictions of response rates based on additional response data. For example, the predictive communications distribution system 102 can more heavily weight the user label rate at various time values relative to the group label rates as more responses are received for the given time values. As shown, the predictive communications distribution system 102 repeats the acts 1002-1012 in performing a step for determining a send time via the response rate prediction model and the plurality of weights corresponding to the different combinations of the time granularities and the attribute groups corresponding to the user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
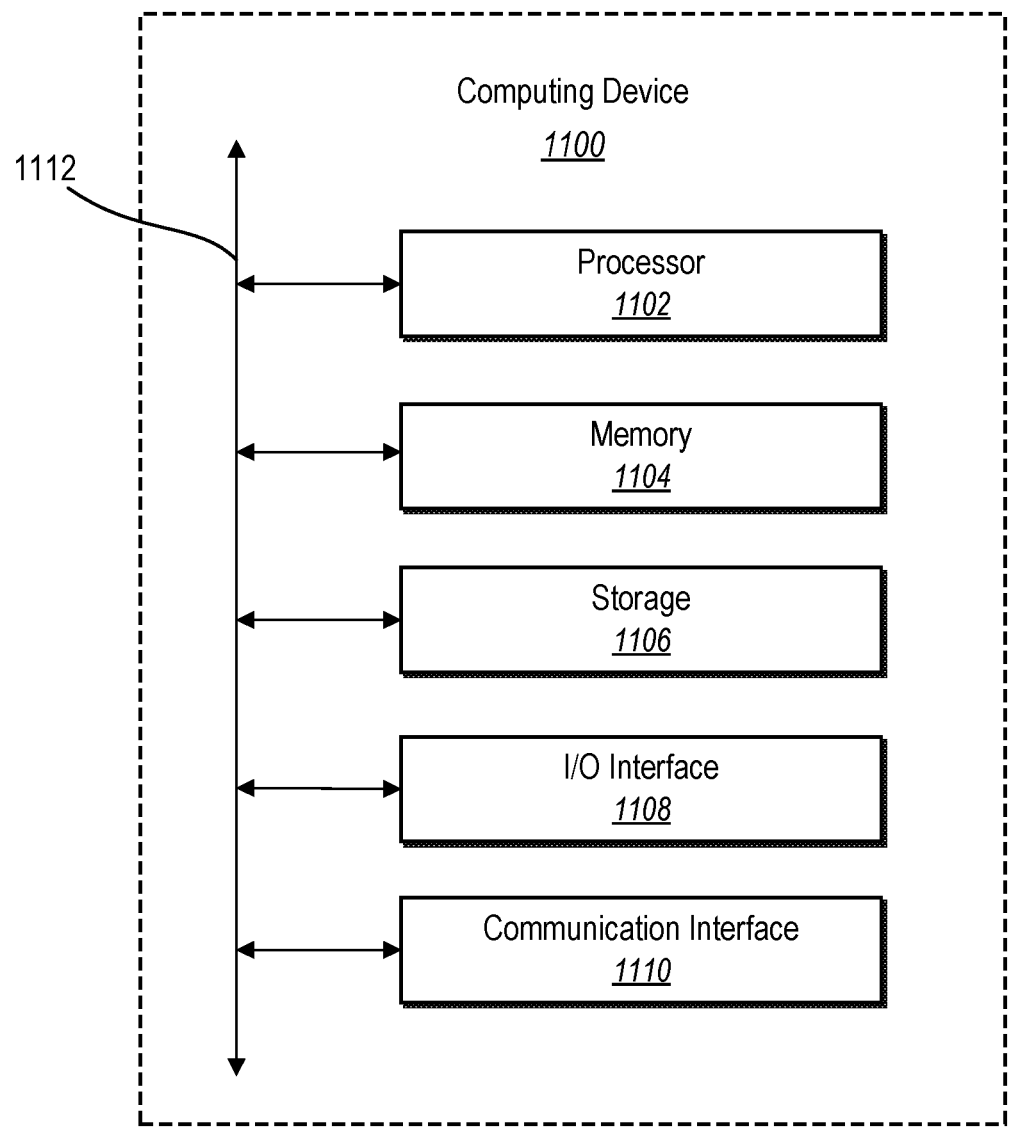
FIG. 11 illustrates a block diagram of an example computing device in accordance with one or more embodiments.

FIG. 11 illustrates, in block diagram form, an example computing device 1100 (e.g., the computing device 800, the client devices 108a-108n, the administrator device 114, and/or the server(s) 104) that may be configured to perform one or more of the processes described above. One will appreciate that the predictive communications distribution system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for distributing electronic communications, a computer-implemented method of determining electronic communication send times using a Bayesian approach, the computer-implemented method comprising:
   identifying one or more responses to a plurality of electronic communications transmitted to a user;
   determining a response rate at a target time granularity via a response rate prediction model by:
      identifying, based on responses received from a first attribute group that includes the user, a first label rate indicating a ratio between responses received from, and electronic communications delivered to, the first attribute group over a first coarse time granularity coarser than the target time granularity;
      identifying, based on responses received from a second attribute group that includes the user, a second label rate indicating a ratio between responses received from, and electronic communications delivered to, the second attribute group over a second coarse time granularity coarser than the target time granularity and the first coarse time granularity; and
      determining the response rate at the target time granularity by applying a user weight to the one or more responses, a first weight to the first label rate, and a second weight to the second label rate;
   determining a send time based on the response rate utilizing a Bayes upper-confidence-bound send time model; and
   providing an electronic communication to the user based on the send time.

2. The computer-implemented method of claim 1, wherein identifying the first label rate comprises determining a relationship between a number of responses associated with the first attribute group and a number of electronic communications provided to the first attribute group.

3. The computer-implemented method of claim 1, further comprising:
   identifying one or more additional responses to additional electronic communications provided to the user; and
   based on the one or more additional responses, modifying one or more of the first weight corresponding to the first coarse time granularity and the first attribute group or the second weight corresponding to the second coarse time granularity and the second attribute group.

4. The computer-implemented method of claim 1, wherein determining the response rate comprises determining one or more of an open rate, a click rate, or a conversion rate.

5. The computer-implemented method of claim 4, further comprising receiving an input from an administrator device to define the response rate as one or more of the open rate, the click rate, or the conversion rate.

6. A non-transitory computer readable medium comprising instructions that, when executed by at least one processor, cause a computer device to:
   identify one or more responses to a plurality of electronic communications transmitted to a user;
   determine a response rate at a target time granularity via a response rate prediction model by:
      identifying, based on responses received from a first attribute group that includes the user, a first label rate indicating a ratio between responses received from, and electronic communications delivered to, the first attribute group over a first coarse time granularity coarser than the target time granularity;
      identifying, based on responses received from a second attribute group that includes the user, a second label rate indicating a ratio between responses received from, and electronic communications delivered to, the second attribute group over a second coarse time granularity coarser than the target time granularity and the first coarse time granularity; and
      determining the response rate at the target time granularity by applying a user weight to the one or more responses, a first weight to the first label rate, and a second weight to the second label rate;
   determine a send time based on the response rate utilizing a Bayes upper-confidence-bound send time model; and
   provide an electronic communication to the user based on the send time.

7. The non-transitory computer readable medium of claim 6, further comprising instructions that, when executed by the at least one processor, cause the computer device to:
   determine, utilizing the Bayes upper-confidence-bound send time model, a first quantile score for a first send time based on a predicted response rate for the first send time and a number of messages the user has received at the first send time;
   determine, utilizing the Bayes upper-confidence-bound send time model, a second quantile score for a second send time based on a predicted response rate for the second send time and a number of messages the user has received at the second send time; and
   select the send time by comparing the first quantile score and the second quantile score.

8. The non-transitory computer readable medium of claim 7, further comprising instructions that, when executed by the at least one processor, cause the computer device to:
 identify one or more additional responses to additional electronic communications provided to the user; and
 based on the one or more additional responses, reduce the first weight corresponding to the first coarse time granularity and the first attribute group and the second weight corresponding to the second coarse time granularity and the second attribute group.

9. The non-transitory computer readable medium of claim 7, further comprising instructions that, when executed by the at least one processor, cause the computer device to:
 identify one or more additional responses to additional electronic communications provided to the user; and
 based on the one or more additional responses, increase the user weight applied to the one or more responses.

10. The non-transitory computer readable medium of claim 6, wherein identifying the first label rate comprises determining a relationship between a number of responses associated with the first attribute group and a number of electronic communications provided to the first attribute group.

11. The non-transitory computer readable medium of claim 6, further comprising instructions that, when executed by the at least one processor, cause the computer device to determine, via the response rate prediction model, predicted response rates associated with a plurality of time values within the target time granularity.

12. The non-transitory computer readable medium of claim 11, wherein the send time comprises a time to provide the electronic communication to the user and that has a highest response rate from among the plurality of time values within the target time granularity.

13. The non-transitory computer readable medium of claim 6, wherein the user weight comprises a quantity of the plurality of electronic communications transmitted to the user.

14. The non-transitory computer readable medium of claim 6, wherein identifying the first label rate corresponding to the first coarse time granularity and the first attribute group comprises:
 determining an initial first label rate that indicates an initial ratio between a number of responses received from the first attribute group for the first coarse time granularity and a number of electronic communications sent to the first attribute group for the first coarse time granularity; and
 applying a Bayesian smoothing factor to the initial first label rate to generate a smoothed label rate.

15. The non-transitory computer readable medium of claim 6, wherein identifying the first label rate corresponding to the first coarse time granularity and the first attribute group comprises:
 determining an initial first label rate that indicates an initial ratio between a number of responses received from the first attribute group for the first coarse time granularity and a number of electronic communications sent to the first attribute group for the first coarse time granularity; and scaling the initial first label rate based on a mean of the one or more responses to the plurality of electronic communications transmitted to the user.

16. A system comprising:
 at least one processor; and
 a non-transitory computer readable medium comprising instructions that, when executed by the at least one processor, cause the system to train a response rate prediction model by:
  identifying a user label rate corresponding to a user for a time granularity;
  determining, based on responses received from a first attribute group that includes the user, a first label rate indicating a ratio between responses received from, and electronic communications delivered to, a first attribute group over a first coarse time granularity coarser than the time granularity;
  determining, based on responses received from a second attribute group that includes the user, a second label rate indicating a ratio between responses received from, and electronic communications delivered to, a second attribute group over a second coarse time granularity coarser than the time granularity and the first coarse time granularity;
  generating a predicted response rate associated with the user for the time granularity based on a first combination of the user label rate and a user weight, a second combination of the first label rate and a first weight, and a third combination of the second label rate and a second weight; and
  modifying at least one of the user weight, the first weight, or the second weight based on comparing the predicted response rate and a ground truth response rate associated with the user.

17. The system of claim 16, further comprising instructions that, when executed by the at least one processor, cause the system to train the response rate prediction model by further utilizing an optimization function to compare the predicted response rate with a ground truth response rate to determine a measure of loss associated with the response rate prediction model.

18. The system of claim 17, further comprising instructions that, when executed by the at least one processor, cause the system to modify at least one of the user weight, the first weight, or the second weight to reduce the measure of loss associated with the response rate prediction model.

19. The system of claim 16, wherein determining the first label rate corresponding to the first coarse time granularity and the first attribute group including the user comprises determining an initial first label rate that indicates an initial ration between a number of responses received from the first attribute group for to the first coarse time granularity and a number of electronic communications sent to the first attribute group for the first coarse time granularity.

20. The system of claim 16, wherein determining the first label rate corresponding to the first coarse time granularity and the first attribute group including the user comprises scaling the first label rate based on a mean of one or more responses to a plurality of electronic communications transmitted to the user.

* * * * *